US012657923B2

(12) United States Patent
Xu et al.

(10) Patent No.:  US 12,657,923 B2
(45) Date of Patent:      Jun. 16, 2026

(54) METHOD AND APPARATUS FOR MANAGING STORAGE CABINET

(71) Applicant: BOE TECHNOLOGY GROUP CO., LTD., Beijing (CN)

(72) Inventors: Jingtao Xu, Beijing (CN); Hanwen Liu, Beijing (CN); Mingyue Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 90 days.

(21) Appl. No.: 18/580,701

(22) PCT Filed: Dec. 19, 2022

(86) PCT No.: PCT/CN2022/140140
§ 371 (c)(1),
(2) Date: Jan. 19, 2024

(87) PCT Pub. No.: WO2024/130511
PCT Pub. Date: Jun. 27, 2024

(65) Prior Publication Data
US 2025/0104432 A1      Mar. 27, 2025

(51) Int. Cl.
*G06V 20/52*        (2022.01)
*G06T 7/215*        (2017.01)
(Continued)

(52) U.S. Cl.
CPC ..............  *G06V 20/52* (2022.01); *G06T 7/215* (2017.01); *G06T 7/248* (2017.01); *G06T 7/292* (2017.01);
(Continued)

(58) Field of Classification Search
CPC .... G06V 20/52; G06V 40/171; G06V 10/761; G06V 40/166; G06V 10/764; G06T 7/215; G06T 7/292; G06T 7/248
See application file for complete search history.

(56) References Cited

U.S. PATENT DOCUMENTS

2023/0005321 A1 *  1/2023  Li .............................. G07F 9/02
2023/0008200 A1 *  1/2023  Budano .................... G07C 9/37
2023/0244309 A1 *  8/2023  Ahn ........................ G06V 10/82
                                                                      345/156

FOREIGN PATENT DOCUMENTS

CN          107134053 A  *  9/2017  ............. G07F 11/02
CN          107248091 A      10/2017
(Continued)

OTHER PUBLICATIONS

PCT International Search Report (w/ English translation) and Written Opinion for corresponding Application No. PCT/CN2022/140140, dated Mar. 21, 2023, 12 pages.
(Continued)

*Primary Examiner* — Rowina J Cattungal
(74) *Attorney, Agent, or Firm* — Dority & Manning, P.A.

(57)                ABSTRACT

A method for managing a storage cabinet is provided. The method includes: acquiring face information of a user in response to the user approaching the storage cabinet, and determining feature information of the user according to the face information; acquiring a plurality of sets of image data in response to an operation of opening the storage cabinet by the user, a set of image data in the plurality of sets of image data including multiple frames of image data obtained by taking photographs of an exit location of the storage cabinet from different directions at a same time; determining change information of items in the storage cabinet according to the plurality of sets of image data; and outputting multimedia data related to at least one of the feature information or the
(Continued)

items according to the feature information and the change information in the storage cabinet.

19 Claims, 16 Drawing Sheets

(51) Int. Cl.

| | | |
|---|---|---|
| *G06T 7/246* | (2017.01) | |
| *G06T 7/292* | (2017.01) | |
| *G06V 10/74* | (2022.01) | |
| *G06V 10/764* | (2022.01) | |
| *G06V 40/16* | (2022.01) | |

(52) U.S. Cl.

CPC .......... *G06V 10/761* (2022.01); *G06V 10/764* (2022.01); *G06V 40/166* (2022.01); *G06V 40/171* (2022.01); *G06T 2207/30201* (2013.01)

(56) References Cited

FOREIGN PATENT DOCUMENTS

| | | | |
|---|---|---|---|
| CN | 107798560 | A | 3/2018 |
| CN | 108230554 | A | 6/2018 |
| CN | 108399681 | A | 8/2018 |
| CN | 208027472 | U | * 10/2018 |
| CN | 109191682 | A | 1/2019 |
| CN | 109243096 | A | * 1/2019 ............. G07F 17/12 |
| CN | 109697786 | A | * 4/2019 ....... G06Q 20/40145 |
| CN | 110298965 | A | 10/2019 |
| CN | 211180928 | U | * 8/2020 |
| CN | 113139768 | A | 7/2021 |
| CN | 113554812 | A | 10/2021 |
| CN | 113657236 | A | 11/2021 |
| CN | 215532897 | U | 1/2022 |
| JP | 2007219742 | A | 8/2007 |
| WO | WO2017028117 | A1 | 2/2017 |
| WO | WO2018205116 | A1 | 11/2018 |

OTHER PUBLICATIONS

Zhao, "Design of vending system based on face recognition" (w/ select English translations), Dissertation for the Master Degree in Engineering, Harbin University of Science and Technology, Jun. 2021, 91 pages.

* cited by examiner

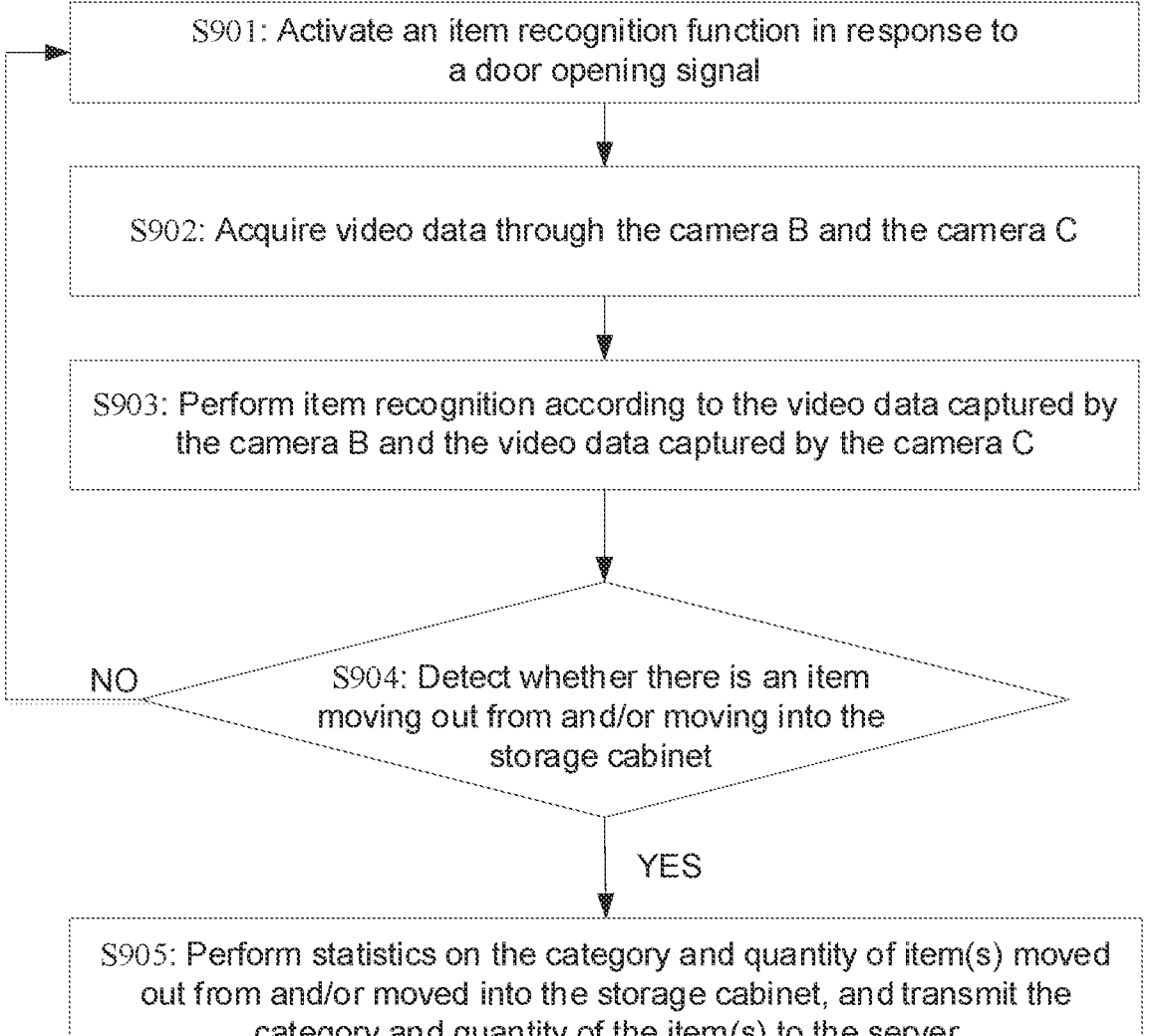

S901: Activate an item recognition function in response to a door opening signal S902: Acquire video data through the camera B and the camera C S903: Perform item recognition according to the video data captured by the camera B and the video data captured by the camera C S904: Detect whether there is an item moving out from and/or moving into the storage cabinet

NO

YES

S905: Perform statistics on the category and quantity of item(s) moved out from and/or moved into the storage cabinet, and transmit the category and quantity of the item(s) to the server

FIG. 9

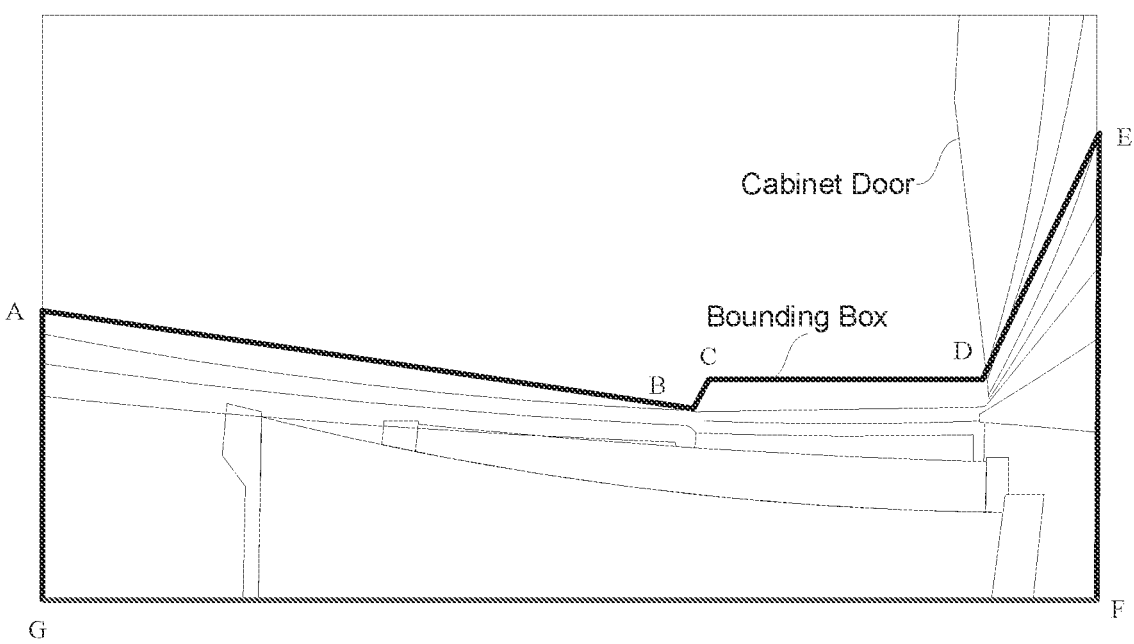

FIG. 10

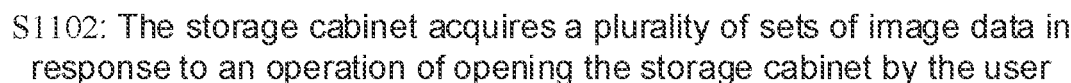

S1101: The storage cabinet acquires face information of a user in response to the user approaching the storage cabinet, and determines feature information of the user according to the face information on the user S1102: The storage cabinet acquires a plurality of sets of image data in response to an operation of opening the storage cabinet by the user S1103: Change information of items in the storage cabinet is determined according to the plurality of sets of image data S1104: The storage cabinet outputs multimedia data according to the feature information of the user and the change information of the items in the storage cabinet

FIG. 11

METHOD AND APPARATUS FOR MANAGING STORAGE CABINET

CROSS-REFERENCE TO RELATED APPLICATION

This application is a national phase entry under 35 USC 371 of International Patent Application No. PCT/CN2022/140140 filed on Dec. 19, 2022, which is incorporated herein by reference in its entirety.

TECHNICAL FIELD

The present disclosure relates to the field of image processing technologies, and in particular, to a method and an apparatus for managing a storage cabinet.

BACKGROUND

With the continuous development of technology, there are more and more intelligent cabinets (such as automatic vending machines, unmanned cabinets, and the like). The widespread use of the intelligent cabinets not only brings convenience to people, but also greatly reduces the working hours of staff.

In some scenarios, such as shopping malls or public places, the cabinets can display images or videos related to the products on their installed screens in order to increase people's interest. This not only captures people's attention but also introduces the products to them. However, in most cases, the images or videos played by the cabinets are preset and lack flexibility.

SUMMARY

In an aspect, a method for managing a storage cabinet is provided. The method includes: acquiring face information of a user in response to the user approaching the storage cabinet, and determining feature information of the user according to the face information of the user; acquiring a plurality of sets of image data in response to an operation of opening the storage cabinet by the user, a set of image data in the plurality of sets of image data including multiple frames of image data obtained by taking photographs of an exit location of the storage cabinet from different directions at a same time; determining change information of items in the storage cabinet according to the plurality of sets of image data; and outputting multimedia data according to the feature information of the user and the change information of the items in the storage cabinet, the multimedia data being related to at least one of the feature information of the user or the items.

In some embodiments, the change information includes taking out an item from the storage cabinet and/or putting an item into the storage cabinet. The "determining change information of items in the storage cabinet according to the plurality of sets of image data" may include: determining an item corresponding to each set of image data in the plurality of sets of image data; and determining the change information of the items in the storage cabinet according to information of items corresponding to the plurality of sets of image data.

In some embodiments, the "determining an item corresponding to each set of image data in the plurality of sets of image data" may include: determining a confidence coefficient of an item included in each frame of image data in a first set of image data, where the first set of image data is any set of image data in the plurality of sets of image data, and the confidence coefficient is used to characterize a similarity between the item and a preset item; and taking an item with a largest confidence coefficient in the first set of image data as an item corresponding to the first set of image data.

In some embodiments, the "determining a confidence coefficient of an item included in each frame of image data in a first set of image data" may include: inputting each frame of image data in the first set of image data into a preset feature information extraction model to obtain feature information of the item in the frame of image data; and calculating a similarity between the feature information of the item and feature information of the preset item to obtain the confidence coefficient of the item, the preset item being an item belonging to the storage cabinet.

In some embodiments, the "determining change information of items in the storage cabinet according to the plurality of sets of image data" may include: in response to detecting that one or more items are removed from the storage cabinet, determining a category and quantity of the one or more items taken out from the storage cabinet according to the plurality of sets of image data; and/or in response to detecting that one or more items are moved into the storage cabinet, determining a category and quantity of the one or more items put into the storage cabinet according to the plurality of sets of image data.

In some embodiments, the method further includes: performing image recognition on the plurality of sets of image data to determine location change information of the items in the plurality of sets of image data; if the location change information of the items is moving an item from inside of the storage cabinet out of a bounding box of the storage cabinet, determining that the item is moved out from the storage cabinet; and if the location change information of the items is moving an item from outside of the storage cabinet into the bounding box of the storage cabinet, determining that the item is moved into the storage cabinet.

In some embodiments, the storage cabinet is provided with a plurality of cameras, each camera is used to capture image data of the exit location of the storage cabinet, and capturing directions of the plurality of cameras are different. The method further includes: for any camera of the plurality of cameras, selecting a plurality of pixel points on a frame of the storage cabinet from image data captured by the camera in response to a selection operation; and acquiring the bounding box of the storage cabinet in the image data by connecting the plurality of pixel points in sequence.

In some embodiments, the "acquiring face information of a user in response to the user approaching the storage cabinet" may include: acquiring image data of the user in response to detecting that a distance between the user and a cabinet door of the storage cabinet is less than a preset distance and the storage cabinet is not opened, and performing face recognition on the image data to obtain the face information of the user; and if clarity of a face of the user in the image data satisfies a first preset threshold, determining the feature information of the user according to the face information of the user.

In some embodiments, the "determining feature information of the user according to the face information of the user" may include: inputting the face information of the user into a preset face feature extraction model to obtain a face feature code of the user; calculating a similarity between the face feature code of the user and face feature codes included in a preset face feature library, wherein the preset face feature library includes a plurality of face feature codes and feature information corresponding thereto, and different face feature codes in the preset face feature library correspond to different identifiers; and if a similarity between a first face feature code and the face feature code of the user is greater than a second preset threshold, taking feature information corresponding to the first face feature code as the feature information of the user, the first face feature code being a face feature code with a largest similarity to the face feature code of the user in the plurality of face feature codes.

In some embodiments, the method further includes: if the similarity between the first face feature code and the face feature code of the user is less than or equal to the second preset threshold, storing the face feature code of the user in the preset face feature library.

In some embodiments, the "outputting multimedia data according to the feature information of the user and the change information of the items in the storage cabinet" may include: transmitting the face feature code of the user and the change information of the items in the storage cabinet to a server in response to an operation of closing the storage cabinet by the user, causing the server to determine the multimedia data related to the face feature code and the items; and receiving, from the server, the multimedia data, and outputting the multimedia data.

In some embodiments, the method further includes: determining information of the items in the storage cabinet in response to closing the storage cabinet; and if a quantity of the items in the storage cabinet is less than a preset quantity, outputting prompt information, the prompt information being used to prompt for increasing the items in the storage cabinet.

In some embodiments, the method further includes: if there is no the change information of the items in the plurality of sets of image data, outputting multimedia data related to the feature information of the user according to the feature information of the user.

In some embodiments, the "outputting multimedia data related to at least one of the feature information of the user or the items" may include: selecting the multimedia data related to at least one of the feature information of the user or the items from a plurality of pieces of pre-configured multimedia data; and outputting the multimedia data.

In some embodiments, the method further includes: in response to detecting that an item is removed from the storage cabinet, tracking a moving track of the item to determine whether the item is put into the storage cabinet again.

In some embodiments, the "tracking a moving track of the item to determine whether the item is put into the storage cabinet again" may include detecting the moving track of the item according to an intersection over union of two adjacent frames of image data in continuous multiple frames of image data.

In another aspect, an apparatus for managing a storage cabinet is provided. The apparatus includes an acquiring unit, a processing unit and an output unit.

The acquiring unit is configured to acquire face information of a user in response to the user approaching the storage cabinet.

The processing unit is configured to determine feature information of the user according to the face information of the user.

The acquiring unit is further configured to acquire a plurality of sets of image data in response to an operation of opening the storage cabinet by the user, where a set of image data in the plurality of sets of image data includes multiple frames of image data obtained by taking photographs of an exit location of the storage cabinet from different directions at a same time.

The processing unit is configured to determine change information of items in the storage cabinet according to the plurality of sets of image data.

The output unit is configured to output multimedia data related to at least one of the feature information of the user or the items according to the feature information of the user and the change information of the items in the storage cabinet.

In some embodiments, the acquiring unit is configured to capture a plurality of frames of image data inside the storage cabinet in a case where an opening angle of a cabinet door of the storage cabinet is in a range of the preset angle and an angular velocity of the cabinet door is in a range of a preset angular velocity.

In some embodiments, the change information of the items in the storage cabinet includes taking out an item from the storage cabinet and/or putting an item into the storage cabinet. The processing unit is configured to: in response to detecting that one or more items are removed from the storage cabinet, determine a category and quantity of the one or more items taken out from the storage cabinet according to the plurality of sets of image data; and/or in response to detecting that one or more items are moved into the storage cabinet, determine a category and quantity of the one or more items put into the storage cabinet according to the plurality of sets of image data.

In some embodiments, the processing unit is further configured to: perform image recognition on the plurality of sets of image data to determine location change information of the items in the plurality of sets of image data; if the location change information of the items is moving an item from inside of the storage cabinet out of a bounding box of the storage cabinet, determine that the item is moved out from the storage cabinet; and if the location change information of the items is moving an item from outside of the storage cabinet into the bounding box of the storage cabinet, determine that the item is moved into the storage cabinet.

In some embodiments, the storage cabinet is provided with a plurality of cameras, each camera is used to capture image data of the exit location of the storage cabinet, and capturing directions of the plurality of cameras are different. The processing unit is further configured to, for any camera of the plurality of cameras, select a plurality of pixel points on a frame of the storage cabinet from image data captured by the camera in response to a selection operation; and acquire the bounding box of the storage cabinet in the image data by connecting the plurality of pixel points in sequence.

In some embodiments, the processing unit is configured to: determine a confidence coefficient of an item included in each frame of image data in a first set of image data, the first set of image data being any set of image data in the plurality of sets of image data, and the confidence coefficient being used to characterize a similarity between the item and a preset item; and take an item with a largest confidence coefficient in the first set of image data as an item corresponding to the first set of image data.

In some embodiments, the processing unit is configured to: input each frame of image data in the first set of image data into a preset feature information extraction model to obtain feature information of the item in the frame of image data; and calculate a similarity between the feature information of the item and feature information of the preset item to obtain the confidence coefficient of the item, the preset item being an item belonging to the storage cabinet.

5

6

In some embodiments, the processing unit is configured to: in response to detecting that an item is removed from the storage cabinet, determine the item(s) taken out from the storage cabinet according to the plurality of sets of image data; and/or in response to detecting that an item is moved into the storage cabinet, determine the item put into the storage cabinet according to the plurality of sets of image data.

In some embodiments, the output unit is configured to: transmit the face feature code of the user and the change information of the items in the storage cabinet to a server in response to an operation of closing the storage cabinet by the user, causing the server to determine the multimedia data related to the face feature code and the items; and receive, from the server, the multimedia data, and output the multimedia data.

In some embodiments, the acquiring unit is configured to acquire image data of the user in response to detecting that a distance between the user and a cabinet door of the storage cabinet is less than a preset distance and the storage cabinet is not opened. The processing unit is configured to perform face recognition on the image data to obtain the face information of the user.

In some embodiments, the processing unit is configured to: input the face information of the user into a preset face feature extraction model to obtain a face feature code of the user; calculate a similarity between the face feature code of the user and face feature codes included in a preset face feature library, the preset face feature library including a plurality of face feature codes and feature information corresponding thereto, and different face feature codes in the preset face feature library corresponding to different identifiers; and if a similarity between a first face feature code and the face feature code of the user is greater than a second preset threshold, take feature information corresponding to the first face feature code as the feature information of the user, the first face feature code being a face feature code with a largest similarity to the face feature code of the user in the plurality of face feature codes.

In some embodiments, the processing unit is further configured to, if the similarity between the first face feature code and the face feature code of the user is less than or equal to the second preset threshold, store the face feature code of the user in the preset face feature library.

In some embodiments, the processing unit is further configured to, determine information of the items in the storage cabinet in response to closing the storage cabinet; and if a quantity of the items in the storage cabinet is less than a preset quantity, output prompt information, the prompt information being used to prompt for increasing the items in the storage cabinet.

In some embodiments, the output unit is further configured to, if there is no the change information of the items in the plurality of sets of image data, output the multimedia data related to the feature information of the user according to the feature information of the user.

In yet another aspect, an apparatus for managing a storage cabinet is provided. The apparatus includes: a processor and a communication interface, the communication interface is coupled to the processor, and the processor is used to run a computer program or instructions to implement the method for managing the storage cabinet in any of the above embodiments.

In still yet another aspect, a storage cabinet is provided. The storage cabinet includes the apparatus for managing the storage cabinet, a sensor and a plurality of cameras. The apparatus is communicatively connected to the sensor and the plurality of cameras, respectively. The sensor is used to, detect whether a cabinet door of the storage cabinet is opened, and if it is detected that the cabinet door of the storage cabinet is opened, output a door opening signal. The plurality of cameras are arranged at different locations of a door frame of the storage cabinet, and orientations of the plurality of cameras are different; and the plurality of cameras are used to take photographs of an exit location of the storage cabinet at a same time in response to the door opening signal to obtain a plurality of sets of image data.

In still yet another aspect, a non-transitory computer-readable storage medium is provided. The computer-readable storage medium has stored computer program instructions, and the computer program instructions, when executed on a computer (e.g., the storage cabinet), cause the computer to perform the method for managing the storage cabinet according to any of the above embodiments.

In still yet another aspect, a computer program product is provided. The computer program product includes computer program instructions, and the computer program instructions, when are executed on a computer (e.g., the storage cabinet), cause the computer to perform the method for managing the storage cabinet according to any of the above embodiments.

In still yet another aspect, a computer program is provided. The computer program, when executed by a computer (e.g., the storage cabinet), causes the computer to perform the method for managing the storage cabinet according to any of the above embodiments.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

FIG. 9 is a flowchart of recognizing information of an item according to image data in accordance with some embodiments;

FIG. 10 is a schematic diagram of a bounding box of a storage cabinet in accordance with some embodiments;

FIG. 11 is a flowchart of a method for managing a storage cabinet in accordance with some embodiments;

DETAILED DESCRIPTION

Figure 1:
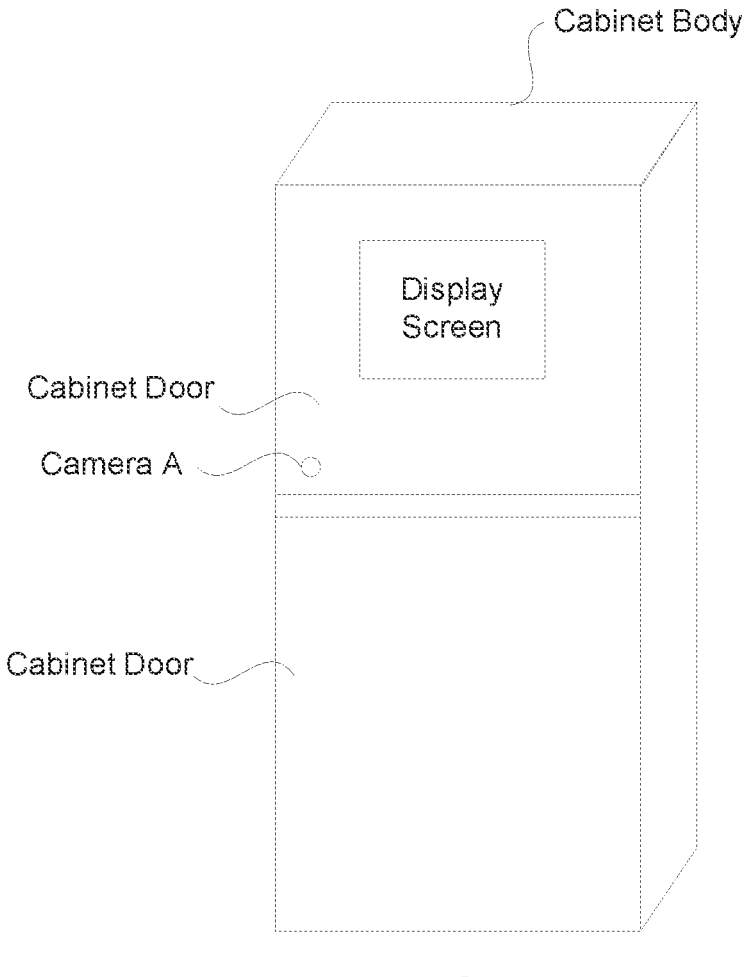
FIG. 1 is a structural diagram of a storage cabinet in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representation of the above terms does not necessarily refer to the same embodiment(s) or example(s). In addition, specific features, structures, materials, or characteristics described herein may be included in any one or more embodiments or examples in any suitable manner.

Hereinafter, the terms "first" and "second" are only used for descriptive purposes and cannot be construed as indicating or implying the relative importance or implicitly indicating the quantity of indicated technical features. Thus, features defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" used herein means an open and inclusive language, which does not exclude apparatuses that are applicable to or configured to perform additional tasks or steps.

In addition, the use of the phase "based on" means openness and inclusiveness, since a process, step, calculation or other action that is "based on" one or more of the stated conditions or values may, in practice, be based on additional conditions or values exceeding those stated.

The widespread use of intelligent cabinets brings a lot of convenience to people, such as intelligent refrigerator and unmanned vending machines (which will be described later as storage cabinets for unified description). In some scenarios, such as shopping malls and public places, a storage cabinet can play multimedia data (such as image data, audio data and video data) related to items therein through installed playing devices (such as a display and a stereo). This not only captures people's attention but also introduces the items in the storage cabinets to them.

However, in some cases, the multimedia data played by the storage cabinet is preset and cannot be adjusted according to people's hobbies or interests, which lacks flexibility.

In light of this, embodiments of the present disclosure provide a method for managing a storage cabinet. In a case of detecting that a user is approaching the storage cabinet, face information of the user is acquired; and then, after the user opens the storage cabinet, a plurality of sets of image data of an item that is taken out from the storage cabinet by the user or put in the storage cabinet by the user are capturing from different directions, and the item taken out from the storage cabinet or put in the storage cabinet by the user is detected according to the plurality of sets of image data. In this way, the storage cabinet determines feature information of the user according to the face information of the user, and then outputs multimedia data related to the user and/or items according to the feature information of the user and the item taken out or put in by the user. Since the item taken out from or put in the storage cabinet may be an item of interest to the user, the storage cabinet can push the multimedia data according to the interests and hobbies of the user, thereby adjusting the data in a more flexible way.

In addition, in the embodiments of the present disclosure, the storage cabinet may further detect the change in the quantity of items therein according to the item taken out or put in by the user, so as to remind timely replenishment if the quantity of the items is too small.

The embodiments of the present disclosure will be described in detail below with reference to the accompanying drawings.

As shown in FIG. 1, FIG. 1 shows a storage cabinet provided in the embodiments of the present disclosure. The storage cabinet may include a cabinet body and a cabinet door. The cabinet body is connected to the cabinet door.

The cabinet body is used for placing items. The cabinet door is provided thereon with a camera A. The orientation of the camera A is consistent with the orientation of the storage cabinet. The camera A is used to capture image data of users who are approaching the storage cabinet or in front of the storage cabinet.

In a possible implementation, the camera A may be arranged at a handle of the cabinet door or at the middle of the cabinet door. For example, the camera A may be arranged in the middle of the cabinet door, and have a preset height from the bottom of the storage cabinet. The preset height is set as required. For example, the preset height may be a height at which a face can be photographed, such as 1.7 meters. Of course, the camera A may also be arranged on the edge of the cabinet door, such as above the door handle (the location shown in FIG. 1).

In an example, in order to ensure that the camera A can capture as much image data as possible on the user approaching the camera A, the camera A may be a high-definition camera.

In another example, in order to avoid a situation in which the camera A still shoots if there is no user approaching the storage cabinet or the user is far away from the storage cabinet, the storage cabinet may be provided with a sensor, which is used for detecting whether there is a user approaching the storage cabinet. For example, the sensor may be a distance sensor (such as an infrared sensor). The storage cabinet can determine whether a user approaches the storage cabinet according to a distance detected by the sensor. For example, if the distance detected by the sensor is less than a preset value, it means that a user is approaching the storage cabinet, and then the storage cabinet can control the camera A to start taking photographs. The preset value is set as required, for example, the preset value may be 0.3 meters, 0.5 meters, or the like, which is not limited.

In another example, in order to display multimedia data, as shown in FIG. 1, the storage cabinet may also be provided with a display screen. The display screen may be arranged on the outside of the cabinet door. The display screen can be used to play the multimedia data.

In another example, the storage cabinet provided in the embodiments of the present disclosure may also be provided with a voice playing device (such as a stereo and a loud-speaker). In this way, the storage cabinet can output warning information through the voice playing device. Of course, the storage cabinet may also display other voice information through the voice playing device, for example, may also play "WELCOME", "PLEASE CLOSE THE CABINET DOOR", "INSUFFICIENT NUMBER OF ITEMS, PLEASE REPLENISH ITEMS IN TIME" or the like.

In another example, in order to detect whether the storage cabinet is opened, the storage cabinet may also be provided with an angle sensor, which can be used to detect an opening angle of the storage cabinet (i.e., an included angle between the cabinet door and the cabinet body). If the opening angle is 0 degrees, it means that the storage cabinet is closed; and if the opening angle is greater than 0 degrees, it means that the storage cabinet is opened.

Figure 2:
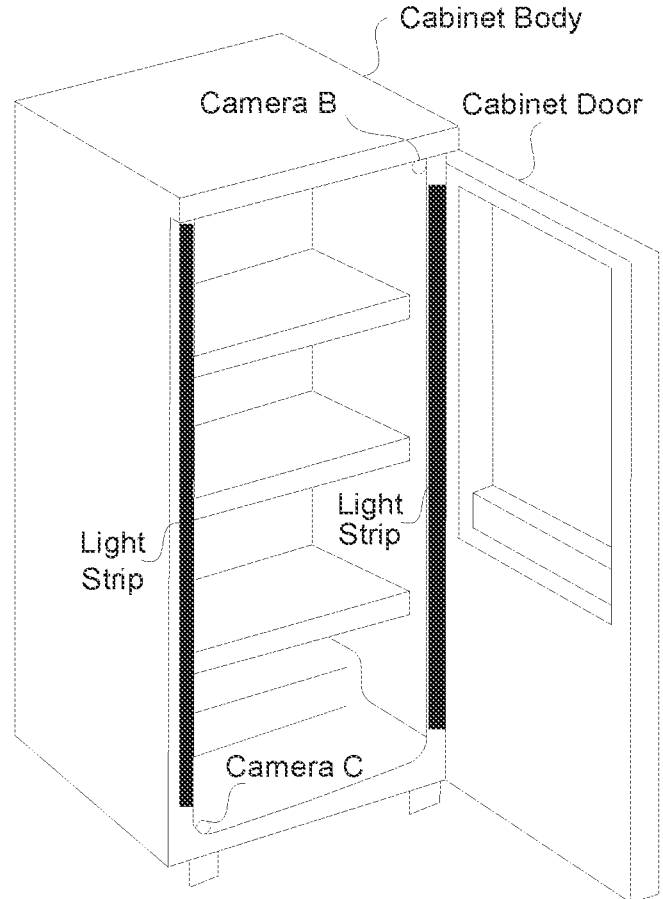
FIG. 2 is a structural diagram of a storage cabinet in accordance with some embodiments.

In another example, in order to capture information of an item taken out from the storage cabinet by the user and/or an item put in the storage cabinet by the user, as shown in FIG. 2, the storage cabinet may further be provided with a camera B and a camera C. The installation positions of the camera B and the camera C are different, and orientations of the camera B and the camera C are opposite. In this way, the camera B and the camera C can capture image data of items out and into the storage cabinet at different directions.

For example, the storage cabinet can control the camera B and the camera C to start taking photographs in response to detecting that the cabinet door of the storage cabinet is opened.

Figure 3:
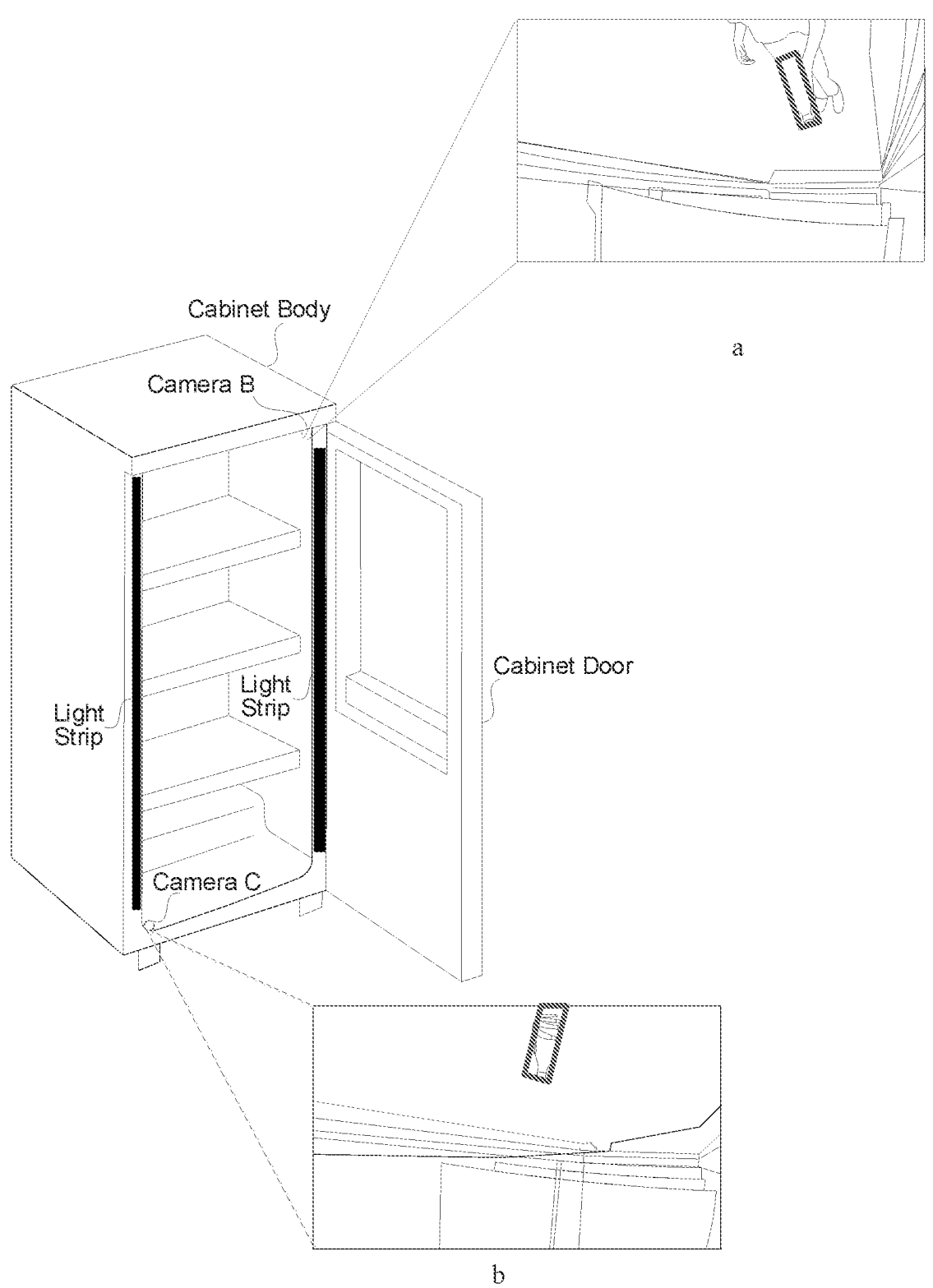
FIG. 3 is a schematic diagram of image data captured by cameras of a storage cabinet in accordance with some embodiments.

In an example, "a" in FIG. 3 is image data captured by the camera B, and "b" in FIG. 3 is image data captured by camera C.

In addition, in combination with the angle sensor above-mentioned, the storage cabinet can control the camera B and the camera C to start taking photographs in response to the opening angle of the storage cabinet reaching a preset angle. The preset angle is set as required, for example, the preset angle may be 30 degrees, 45 degrees or the like.

As another example, after the storage cabinet is opened, in order to avoid repeated taking photographs, the storage cabinet can control the camera A and the camera B to stop taking photographs in a case of detecting that the cabinet door stops rotating. For example, if multiple opening angles detected by the angle sensor are the same in a continuous period of time, the storage cabinet can determine that the cabinet door stops rotating.

It will be noted that in the embodiments of the present disclosure, the storage cabinet may further be provided with more cameras, in which different cameras have different capturing directions.

In another example, in order to make the image data captured by the camera clearer, as shown in FIG. 2, both sides of the cabinet body of the storage cabinet may be provided thereon with light strips. The light strips of the storage cabinet can be turned on in response to the opening of the cabinet door, so that the brightness inside the storage cabinet may be increased, making the image data captured by the camera clearer.

In another possible implementation, the storage cabinet may further be provided with a processing device, which is connected to the camera A, the camera B and the camera C through a system bus, for example. The processing device can be used to, control the cameras, perform image recognition on the image data captured by the cameras, determine the feature information of the user who is approaching the storage cabinet and determine the item that the user takes out from the storage cabinet or puts in the storage cabinet. The specific recognizing process may be referred to the following embodiments.

In some scenarios, the processing device may be a card board, a circuit, a processor (e.g., a central processing unit (CPU)), or the like.

In yet another possible implementation, the storage cabinet provided in the embodiments of the present disclosure may further be provided with one or more sensors, which can be used to detect the state of the cabinet door (e.g., opened or closed). For example, the sensor may be arranged on a side on which the cabinet door is connected to the cabinet body.

In another example, the storage cabinet may also be provided with a timer, which can be used for timing. For example, the timer may be used to record the time of each alarm, each time the cabinet door is opened, etc.

Figure 4:
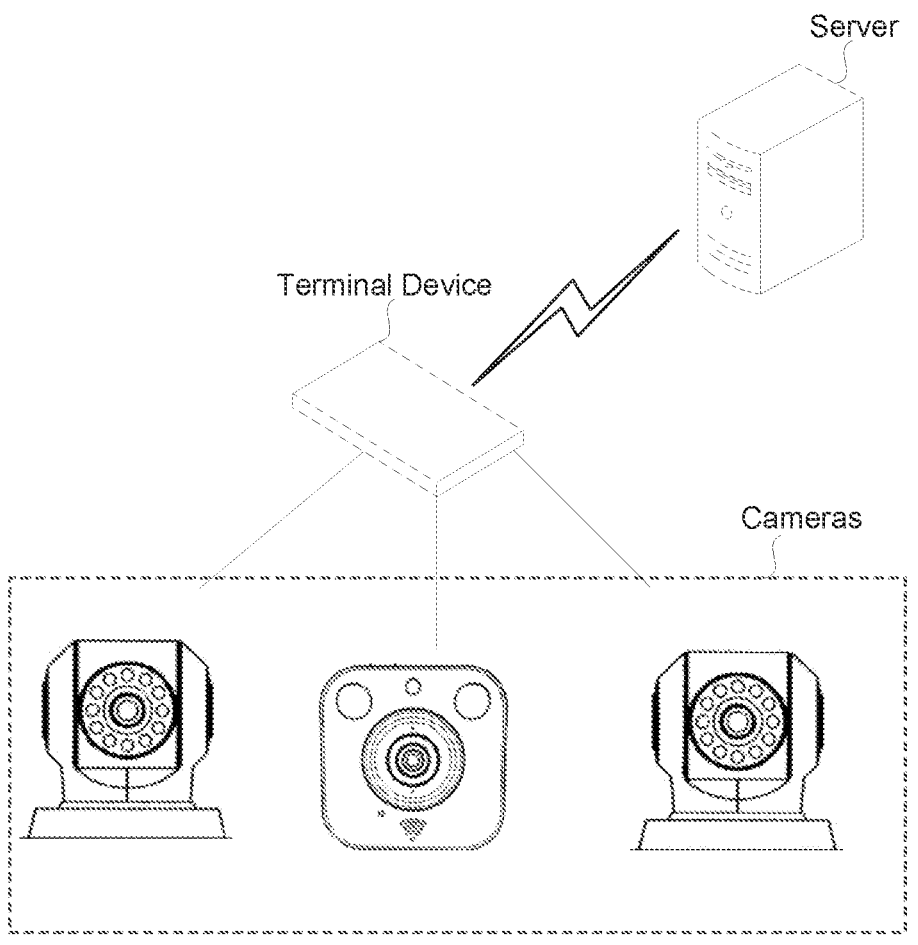
FIG. 4 is a structural diagram of a management system in accordance with some embodiments.

In some embodiments, as shown in FIG. 4, FIG. 4 is an architectural diagram of a management system provided in the embodiments of the present disclosure. The system may include multiple cameras, a terminal device and a server. The terminal device is communicatively connected to the server. For example, the two may be communicatively connected by a wireless method or wired method. The wireless method may include Bluetooth, wireless fidelity (Wi-Fi), a communication network (such as the fifth generation (5G)), etc. The wired method may include a network cable, a system bus, etc.

Here, the multiple cameras may be the camera A to the camera C above-mentioned in FIG. 1 and FIG. 2. The terminal device may be the storage cabinet shown in FIG. 1 and FIG. 2, or a device in the storage cabinet shown in FIG. 1 and FIG. 2, such as a card board, a chip, or the like.

Figure 5:
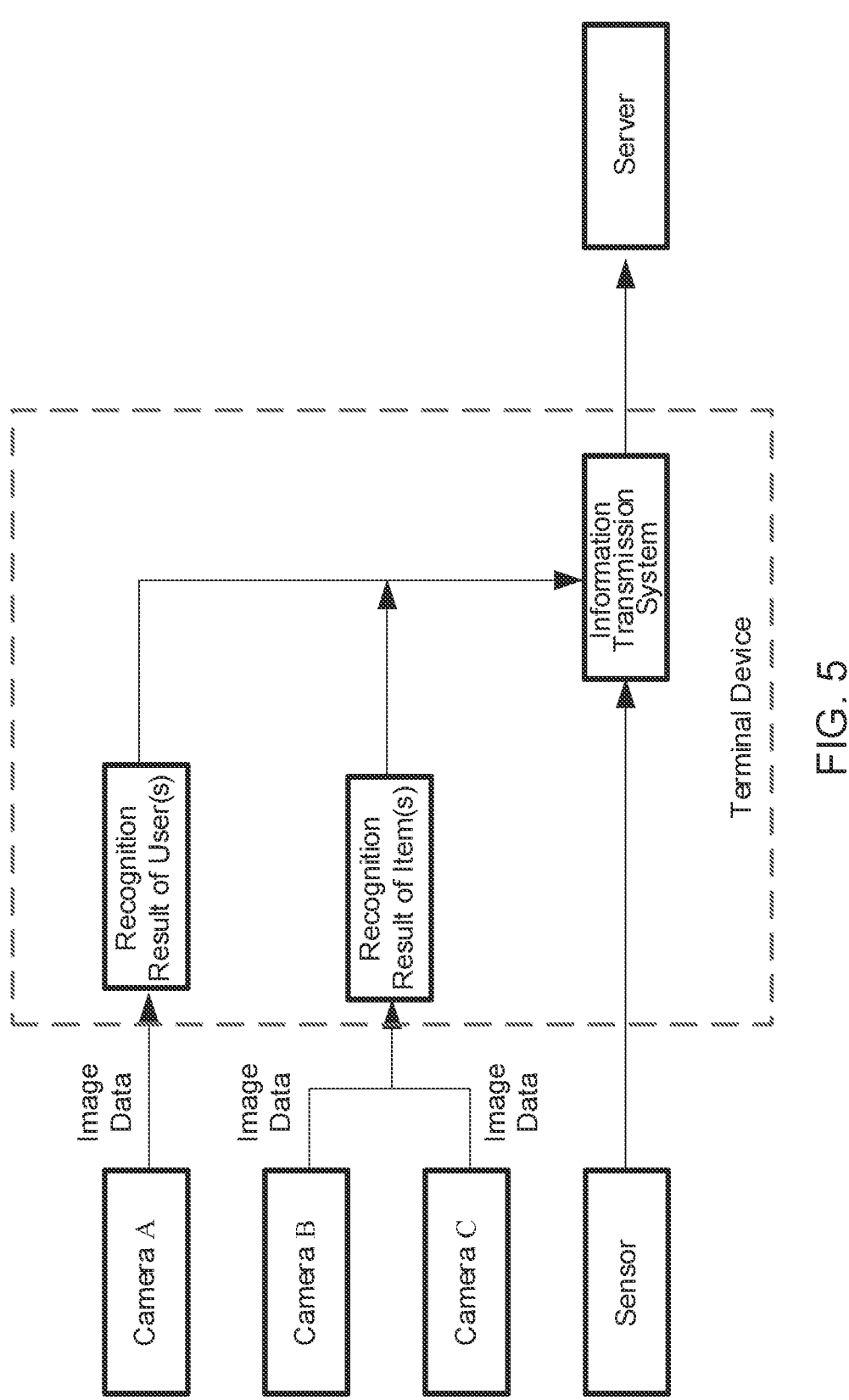
FIG. 5 is a schematic diagram of recognizing image data by a storage cabinet in accordance with some embodiments.

In an example, as shown in FIG. 5, the terminal device recognizes image data captured by the camera A to obtain a recognition result of user(s). The recognition result of the user(s) may include a face property recognition result of the user(s), the quantity of the user(s), a face feature extraction result of the user(s), etc. The terminal device can further recognize image data captured by the camera B and the camera C to obtain a recognition result of item(s). The recognition result of the item(s) may include the category and quantity of the item(s), etc.

In addition, the terminal device may further transmit the recognition results to the server through an information transmission system. The information transmission system may be a transmission channel, a transmission link, a communication unit, or the like between the terminal device and the server.

As shown in FIG. 5, the information transmission system may further determine the time to transmit the recognition results to the server according to a state of opening and closing the cabinet door of the storage cabinet. For example, the information transmission system may transmit the recognition result to the server in response to the cabinet door of the storage cabinet being closed. For example, the information transmission system may be connected with the sensor(s) above-mentioned. In this way, the information transmission system may accurately determine the state of opening and closing the cabinet door of the storage cabinet.

Here, the server can be used to perform face recognition on the user and transmit the multimedia data to the terminal device according to the user and the item taken out from the storage cabinet by the user or put in the storage cabinet by the user.

In some scenarios, the server may be a physical server or a cloud server, and the server may be an individual server or a cluster server, which are not limited.

Figure 6:
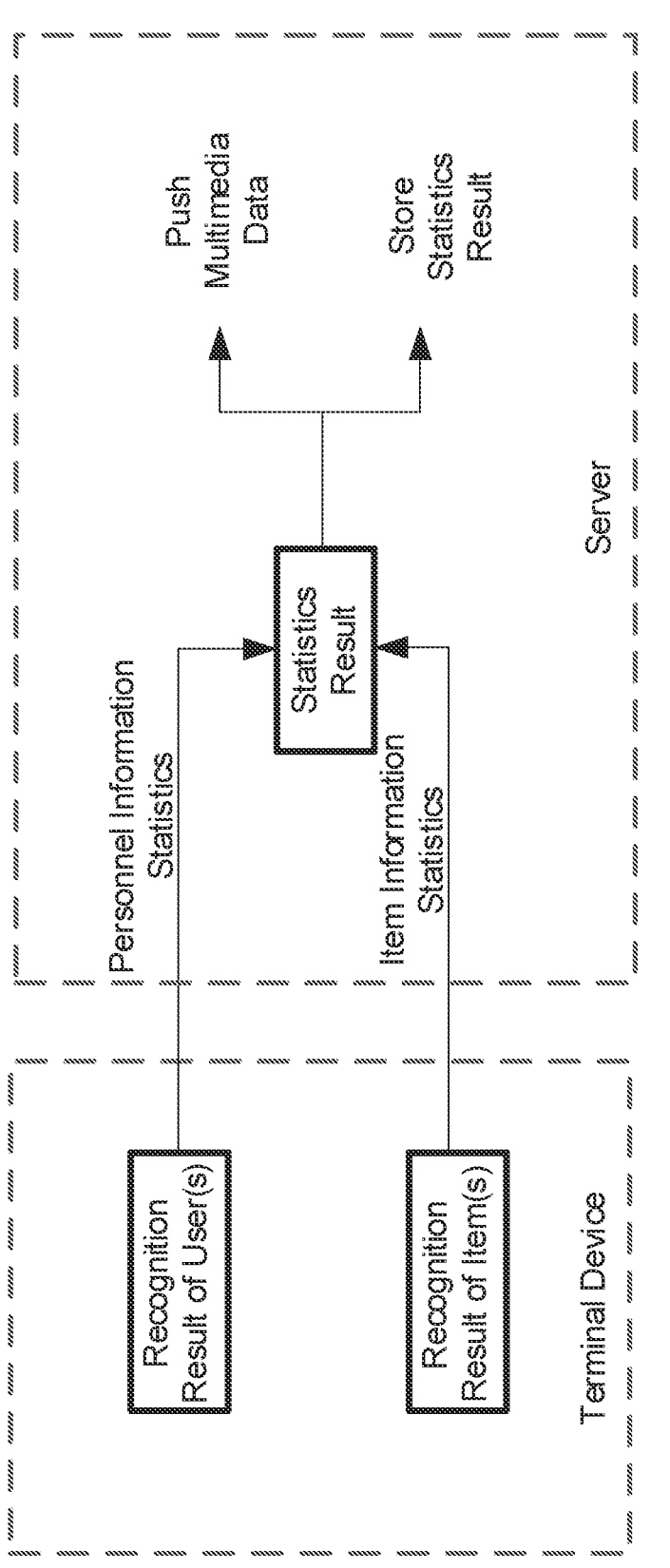
FIG. 6 is a schematic diagram of determining multimedia data by a server according to a recognition result in accordance with some embodiments.

In an example, as shown in FIG. 6, the server may perform personnel information statistics according to the recognition result of the user(s), and perform analysis and statistics according to the recognition result of the item(s), so as to obtain and store a statistics result. The statistics result may include the quantity, age, gender, etc. of the user(s), and the category and quantity of the item(s) taken out from the storage cabinet by the user(s). The server can determine and transmit multimedia data to the terminal device according to the statistics result, where the multimedia data is related to the statistics result. For example, the multimedia data may relate to the item(s) taken out from the storage cabinet by the user.

Figure 7:
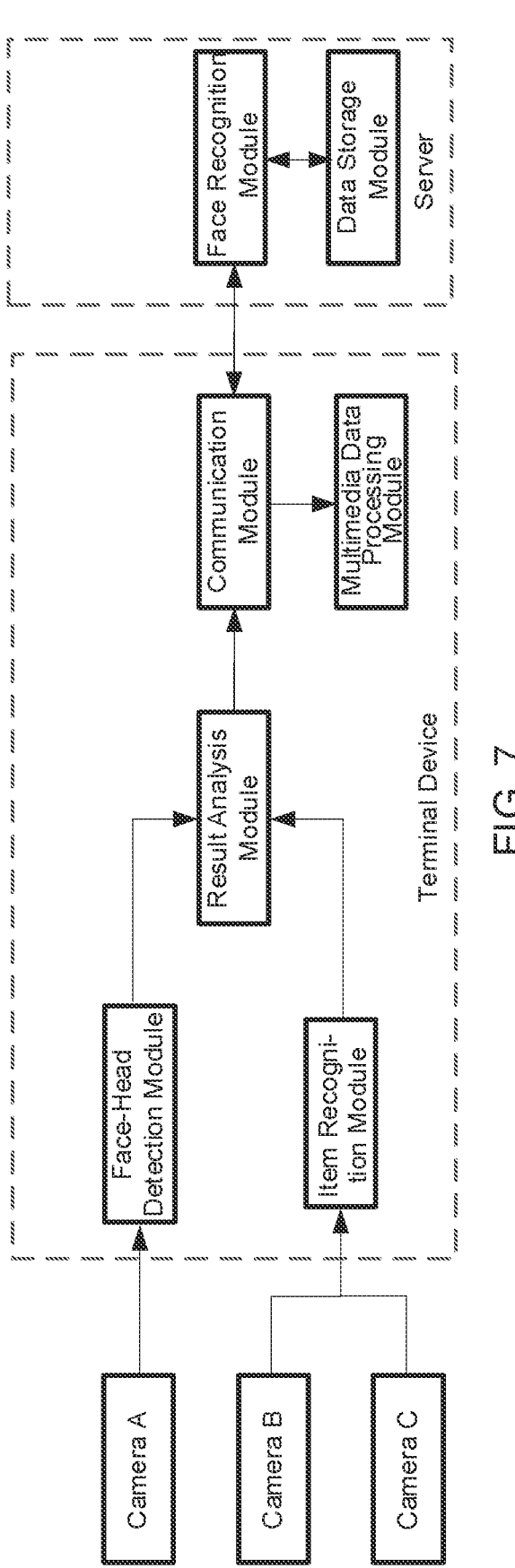
FIG. 7 is a structural diagram of a storage cabinet and a server in accordance with some embodiments.

In a possible implementation, as shown in FIG. 7, the terminal device may include a face-head detection module, an item recognition module, a result analysis module, a communication module, and a multimedia data processing module. The connection manner of these modules may refer to FIG. 7, and will not be described in detail.

Among them, the face-head detection module can be used to perform face recognition on the image data captured by the camera A to obtain user information. The user information may include face information of each user and the quantity of the user(s) in the image data. For the process of the face recognition, reference may be made to the description of embodiments in FIG. 8 below.

The item recognition module can be used to perform item recognize on the image data captured by the camera B and the camera C to obtain the category and quantity of the item(s). The process of the item recognition may refer to the description of FIG. 9, and details are not described here.

The result analysis module can be used to associate a user with an item to determine the item that the user takes out from the storage cabinet or puts in the storage cabinet.

The communication module can be used to transmit, from the result analysis module, an association situation, and the face information of the user to the server.

In an example, as shown in FIG. 7, the server may include a face recognition module and a data storage module. The face recognition module can be used to perform face recognition on the face information of the user, and determine the multimedia data according to the association situation of the user and the item from the terminal device. The data storage module can be used to store the multimedia data, the association situation of the user and the item, the face information of the user, and the item information (such as the category and quantity). For the recognition process of the face information, reference may be made to the description of the subsequent embodiments, and details are not described here.

In an example, the server can call the multimedia data from the data storage module according to the association situation of the user and the item, and transmit the multimedia data to the terminal device. After receiving the multimedia data, the terminal device can analyze and output the multimedia data through the multimedia data processing module.

Figure 8:
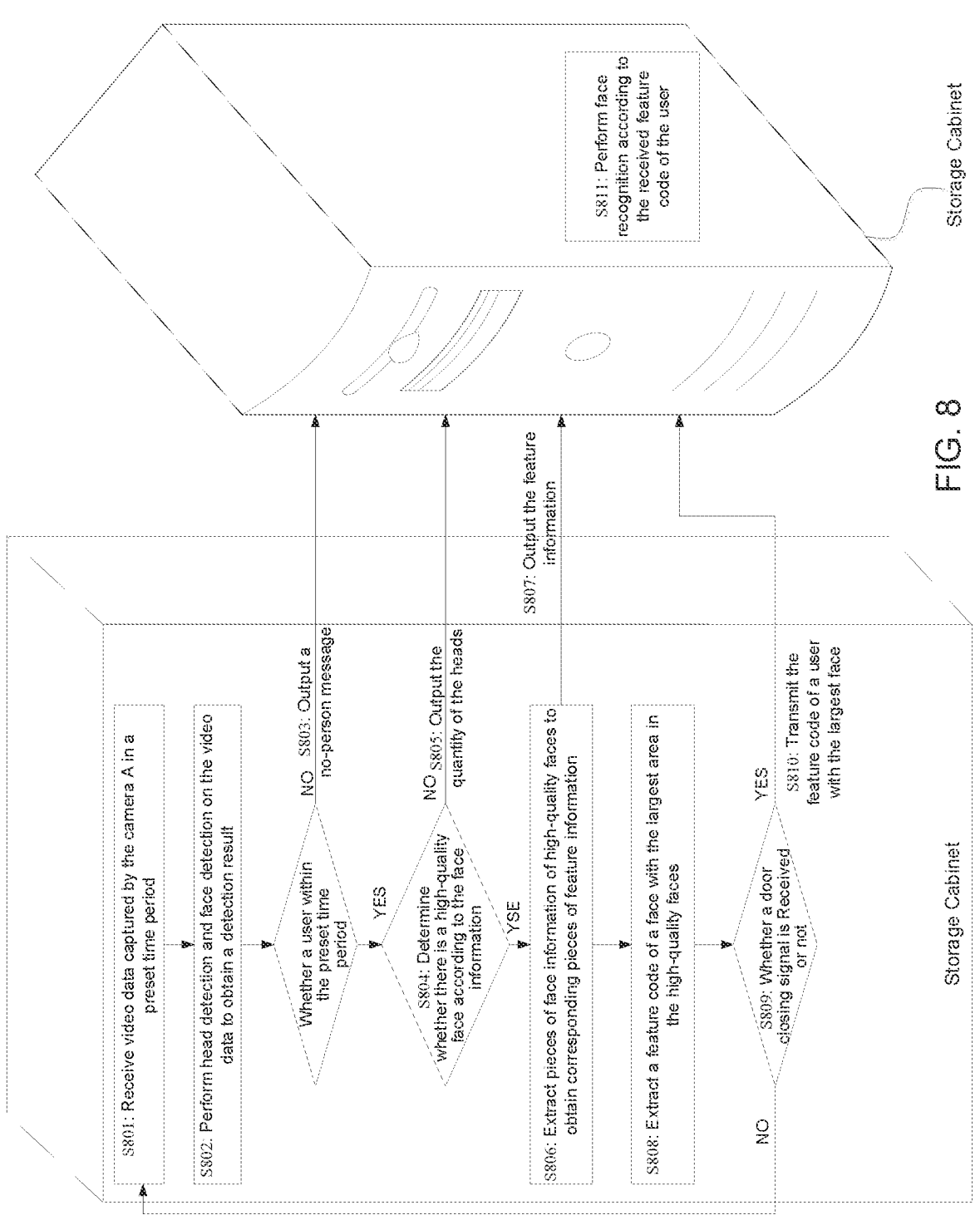
FIG. 8 is a flowchart of recognizing feature information of a user according to image data in accordance with some embodiments.

In an embodiment, as shown in FIG. 8, the above process of the face recognition may include steps S801 to S811.

In S801, the storage cabinet receives video data captured by the camera A in a preset time period.

Here, the preset time period is set as required. For example, the preset time period may be 5 seconds, and of course, it may also be other values, which are not limited.

In S802, the storage cabinet performs head detection and face detection on the video data to obtain a detection result.

Here, the detection result may include that whether there is a user within the preset time period, and if there is a user, it is determined that face information of the user and quantity. The quantity may be head data.

In an example, the head-face detection module detects the quantity of heads and the quantity of faces on the video data through a multi-branch head-face detection model to obtain the detection result. The quantity of the faces is less than or equal to the quantity of the heads.

Here, the multi-branch head-face detection model can locate a head and a face box in the video data, and associate/bind the head and the face box to obtain the detection result.

For example, the multi-branch head-face detection model can extract multiple frames of image data from the video data, and track a head detection box according to the intersection over union of two adjacent frames of image data in the multiple frames of image data. Therefore, the quantity of heads and the quantity of faces in the video data may be accurately determined.

Here, if it is detected that there is no user within the preset time period, S803 is executed; if it is detected that there is a user within the preset time period, S804 is executed.

The preset time period is set as required. For example, the preset time period may be 5 seconds, 6 seconds, or the like, which is not limited.

In S803, the storage cabinet outputs a no-person message.

Here, the no-person message may refer to no user approaching the storage cabinet within the preset time period.

In S804, the storage cabinet determines whether there is a high-quality face according to the face information.

Here, the high-quality face may refer to a face with a face property satisfying a preset condition. The face property may include a clarity of the face. The preset condition may mean that the clarity of the face is higher than a preset value. The preset value is set as required, without limitation. A clear face may include the entire face or a part of the face (such as pupils).

In an example, the face information may be recognized through a face quality recognition model to determine whether there is a high-quality face. For example, an input of the face quality recognition model is the face information, and an output is whether the face is of high quality. The face quality recognition model may be obtained by training according to a preset algorithm and a plurality of high-quality faces. The preset algorithm may be a Residual Attentional Siamese Network 34 (RASNet34) algorithm.

Here, if there is no high-quality face, S805 is executed; if there is a high-quality face, S806 is executed.

In S805, the storage cabinet outputs the quantity of the heads.

Here, the quantity of the heads may refer to the quantity of the faces or the quantity of detectable heads in the image data.

In S806, the storage cabinet extracts face information of high-quality faces to obtain corresponding feature information.

Here, the feature information may include the gender, age, etc., of a user.

In an example, the high-quality faces may be input into a feature information extraction model to obtain feature information corresponding to each high-quality face. The feature information extraction model can be used to extract feature information of a user from the high-quality faces. The feature information extraction module may be obtained by training according to a feature extraction algorithm, a plurality of high-quality faces and corresponding feature information. The feature extraction algorithm may be a RASNet18 algorithm.

In S807, the storage cabinet transmits the feature information of the high-quality face to the server. Accordingly, the server receives the feature information of the high-quality face from the storage cabinet.

In S808, the storage cabinet extracts a feature code of a face with the largest area in the high-quality faces.

Here, the feature code of the face may be a multidimensional array. For example, the feature code may be a 512-dimensional array.

In an example, feature information of the face with the largest area (that is, the face with the largest head detection box) in the high-quality faces may be input into a preset face feature extraction model to obtain the face code of the face. The face feature extraction model may be obtained by training according to a preset algorithm, where the preset algorithm may be a RetinaFace algorithm.

In S809, it is determined that whether the locker receives a door closing signal.

Here, the door closing signal is used to indicate that the storage cabinet is closed.

In an example, detecting that the cabinet door of the storage cabinet is opened, one or more sensors arranged in the storage cabinet transmit the door closing signal to the face-head detection module of the storage cabinet. Accordingly, the head-face detection module receives the door closing signal from the one or more sensors.

Here, if the door closing signal is received, S810 is executed; if the door closing signal is not received, S801 is executed.

In S810, the storage cabinet transmits the feature code of a user with the largest face to the server. Accordingly, the server receives the feature code of the user with the largest face from the terminal device.

In S811, the server performs face recognition according to the received feature code of the user.

Here, the face recognition can be used to determine whether the user has taken out an item from the storage cabinet, and recognize the user.

In an example, the server can calculate a similarity between a face feature code of a user and face feature codes included in a preset face feature library. The preset face feature library includes a plurality of face feature codes and feature information corresponding to each face feature code, and different face feature codes correspond to different identifiers.

Further, if a similarity between a first face feature code and the face feature code of the user is greater than a preset threshold, the server may take feature information corresponding to the first face feature code as feature information of the user. The first face feature code is a face feature code with the largest similarity to the face feature code of the user in the preset face feature library.

In another example, if the similarity between the first face feature code and the face feature code of the user is less than or equal to the preset threshold, the server may store the face feature code of the user in the preset face feature library, and assign an identifier to the face feature code of the user.

Based on the technical solution in FIG. 8, the head-face detection module may first recognize the video data and detect whether there is face information. In a case where there is the face information, it is detected whether there is a high-quality face in the face information. In a case where there is the high-quality face, if a door closing signal is received, it means that the user has taken out an item from the storage cabinet, or an operation of taking out or putting back an item in the storage cabinet by the user has completed. Therefore, the storage cabinet can transmit the feature code of the user with the largest face to the server, so that the server determines the item that the user takes out from the storage cabinet according to the feature code of the user. In this way, it is possible to avoid the phenomenon of incorrect counting of item information due to someone passing by the storage cabinet but does not open the storage cabinet, and multiple items are taken out from the storage cabinet continuously.

In some other embodiments, as shown in FIG. 9, the above-mentioned item recognition process above may include steps S901 to S905.

In S901, in response to a door opening signal, an item recognition function is activated.

Here, for the door opening signal, reference may be made to the description in FIG. 8 above. The item recognition function can be used to recognize an item taken out or put in by the user.

In S902, video data is acquired through the camera B and the camera C.

In S903, item recognition is performed according to the video data captured by the camera B and the video data captured by the camera C.

Here, the item recognition module can extract the plurality of sets of image data from the video data captured by the camera B and the video data captured by the camera C, and determine an item taken out from the storage cabinet by the user and/or put in the storage cabinet by the user according to the plurality of sets of image data.

Here, a set of image data may include image data captured by the camera B and the camera C at an exit location of the storage cabinet at the same time, and multiple frames of image data in the set of image data correspond to different capturing directions.

For the specific process of determining the item taken out from the storage cabinet by the user and/or put in the storage cabinet by the user according to the plurality of sets of image data, reference may be made to the description in the following embodiments, which will not be repeated here.

In S904, it is detected whether there is an item moving out from and/or moving into the storage cabinet.

Here, moving the item out from the storage cabinet may refer to taking out the item from the storage cabinet by the user, and moving the item into the storage cabinet may refer to putting the item in the storage cabinet by the user, and moving the item out from and/or into the storage cabinet may mean that the user puts the item back into the storage cabinet after taking it out from the storage cabinet.

In an example, it may be determined whether an item is moving out from and/or moving into the storage cabinet according to the location change information of the item. For example, if a location of an item in the storage cabinet moves out from a bounding box from the inside of the storage cabinet, it means that the user took the item out from the storage cabinet. As another example, if the location where the item exists in the bounding box, it means that the user puts the item into the storage cabinet.

Here, the bounding box may be a door boundary of the storage cabinet. For example, as shown in FIG. 10, the bounding box may be a closed area formed by A-B-C-D-E-F-G-A. The bounding box may be preset, and the bounding box may be set according to the image data captured by the camera B and the camera C. For example, the bounding box is within the field of view of the camera B and the camera C.

It will be noted that since the locations of the camera B and the camera C are generally unchanged after installation, the location of the bounding box is also unchanged. That is, the setting of the bounding box is related to the installation locations of the cameras.

In an example, for each camera (such as the camera B and the camera C), in response to a setting operation, the storage cabinet selects a plurality of pixels on a frame of the storage cabinet from image data captured by the camera (such as the above pixel point A to pixel point G), and acquires the bounding box of the storage cabinet in the image data (that is, the closed area formed by the above-mentioned A-B-C-D-E-F-G-A) by connecting the plurality of pixel points in sequence. As such, using the bounding box, the storage cabinet can detect whether an item is removed from the storage cabinet and/or whether an item is put into the storage cabinet.

For example, the item recognition module can perform item recognition on the image data captured by the camera B and the camera C, determine the information of the item in the image data, and if it is detected that the item moves out from the bounding box, determine that the user takes out the item from the storage cabinet. Here, for the specific process of the item recognition, reference may be made to the description of the following embodiments, and details are not repeated here.

Further, if it is detected that an item is moved into the bounding box, it is determined that the user puts the item into the storage cabinet.

Here, if it is detected that there is an item being removed from the storage cabinet or that an item is moved into the storage cabinet, S905 is executed; if it is detected that no item is removed from the storage cabinet or that no item is moved into the storage cabinet, S901 is executed.

In S905, statistics are performed on the category and quantity of item(s) moved out from and/or moved into the storage cabinet, and a statistics result is transmitted to the server. Accordingly, the server receives the statistics results from the storage cabinet.

In an example, after receiving the category and quantity of the item(s) from the storage cabinet, the server may determine whether the quantity of items in the storage cabinet is too small according to storage information of the storage cabinet. The storage Information may include the quantity of items of each category stored in the storage cabinet.

Based on the technical solution in FIG. 9, the storage cabinet can determine the change information of the items in the storage cabinet through the item recognition process, so that the server associates item(s) having change with the user, and accurately determines the item(s) taken out from and/or put into the storage cabinet by the user.

The method for managing a storage cabinet provided by the embodiments of the present disclosure will be described below in conjunction with the storage cabinet shown in FIG. 3 and the recognition process in FIG. 8 and FIG. 9.

It will be noted that an execution subject of the embodiments of the present disclosure may be a storage cabinet, a server, or a device in the storage cabinet, a device in the server, such as a chip or system-on-a-chip of the storage cabinet, a chip or system-on-a-chip of the server. The method for managing the storage cabinet provided by the embodiments of the present disclosure will be described below by taking the storage cabinet and the server that serve as the execution subject as an example.

As shown in FIG. 11, embodiments of the present disclosure provide the method for managing the storage cabinet, which includes steps S1101 to S1104.

In S1101, the storage cabinet acquires face information of a user in response to the user approaching the storage cabinet, and determines feature information of the user according to the face information of the user.

Here, the user approaching the storage cabinet may mean that the user is located in front of the storage cabinet, and has a distance with the storage cabinet less than a preset distance, or the user is located within a preset range. The preset range refers to a certain range in front of the storage cabinet. The preset distance and preset range are set according to needs. For example, the preset distance may be 0.3 meters; and the preset range may be a semicircle with a center of the middle of the storage cabinet and a diameter of a width of the storage cabinet, or it may also be other values, which are not limited.

In an example, the storage cabinet may determine whether the user approaches the storage cabinet according to the distance between the storage cabinet and the user detected by the distance sensor.

Here, the process of acquiring the face information of the user by the storage cabinet and the process of determining the feature information of the user according to the face information of the user by the storage cabinet may refer to the above-mentioned embodiments shown in FIG. 8, which will not be described in detail.

In S1102, the storage cabinet acquires a plurality of sets of image data in response to an operation of opening the storage cabinet by the user.

For the plurality of sets of image data and the method for acquiring the plurality of sets of image data, reference may be made to the description of the embodiments shown in FIG. 9, which will not be repeated here.

In an example, the storage cabinet can determine the state of the cabinet door of the storage cabinet according to the state information detected by the angle sensor. For example, if the angle sensor detects that an included angle between the cabinet door and the cabinet body is greater than 0 degrees, it means that the storage cabinet is opened; if the angle sensor detects that the included angle between the cabinet door and the cabinet body is equal to 0 degrees, it means that the storage cabinet is closed. In this way, the storage cabinet can determine that the user opens the storage cabinet in response to the included angle between the cabinet door and the cabinet body being greater than 0 degrees, and control the camera B and the camera C to take photographs at an exit direction of the storage cabinet simultaneously to obtain the plurality of sets of image data.

In S1103, change information of items in the storage cabinet is determined according to the plurality of sets of image data.

Here, the change information may include taking out an item from the storage cabinet and/or putting an item into the storage cabinet.

In response to detecting that an item is removed from the storage cabinet, the storage cabinet can determine the item taken out from the storage cabinet according to the plurality of sets of image data; in response to detecting that an item is moved into the storage cabinet, the storage cabinet can determine the item put in the storage cabinet according to the plurality of sets of image data. In this way, the storage cabinet determines the information of the item moving out and/or into the storage cabinet according to the plurality of sets of image data, and obtains the change information of the items.

In an example, the storage cabinet may recognize the plurality of sets of image data separately to determine an item corresponding to each set of image data, and determine the change information of the items in the storage cabinet according to information of items corresponding to the plurality of sets of image data.

Here, determining the item corresponding to each set of image data may mean recognizing multiple frames of image data of the set of image data separately, determining an item included in each frame of image data, and determining a confidence coefficient of the item included in each frame of image data. The confidence coefficient is used to characterize a similarity between an item and a preset item. The higher the similarity, the higher the confidence coefficient. The preset item may be an item belonging to the storage cabinet. For a method for calculating the confidence coefficient of an item, reference may be made to the description in the following embodiments.

For example, for multiple frames of image data included in any one set of image data in the plurality of sets of image data (for convenience of description, referred to as the first set of image data), the storage cabinet determines a confidence coefficient of an item included in each frame of image data, and takes an item with the largest confidence coefficient in the multiple frames of image data as an item corresponding to the set of image data.

Figure 12:
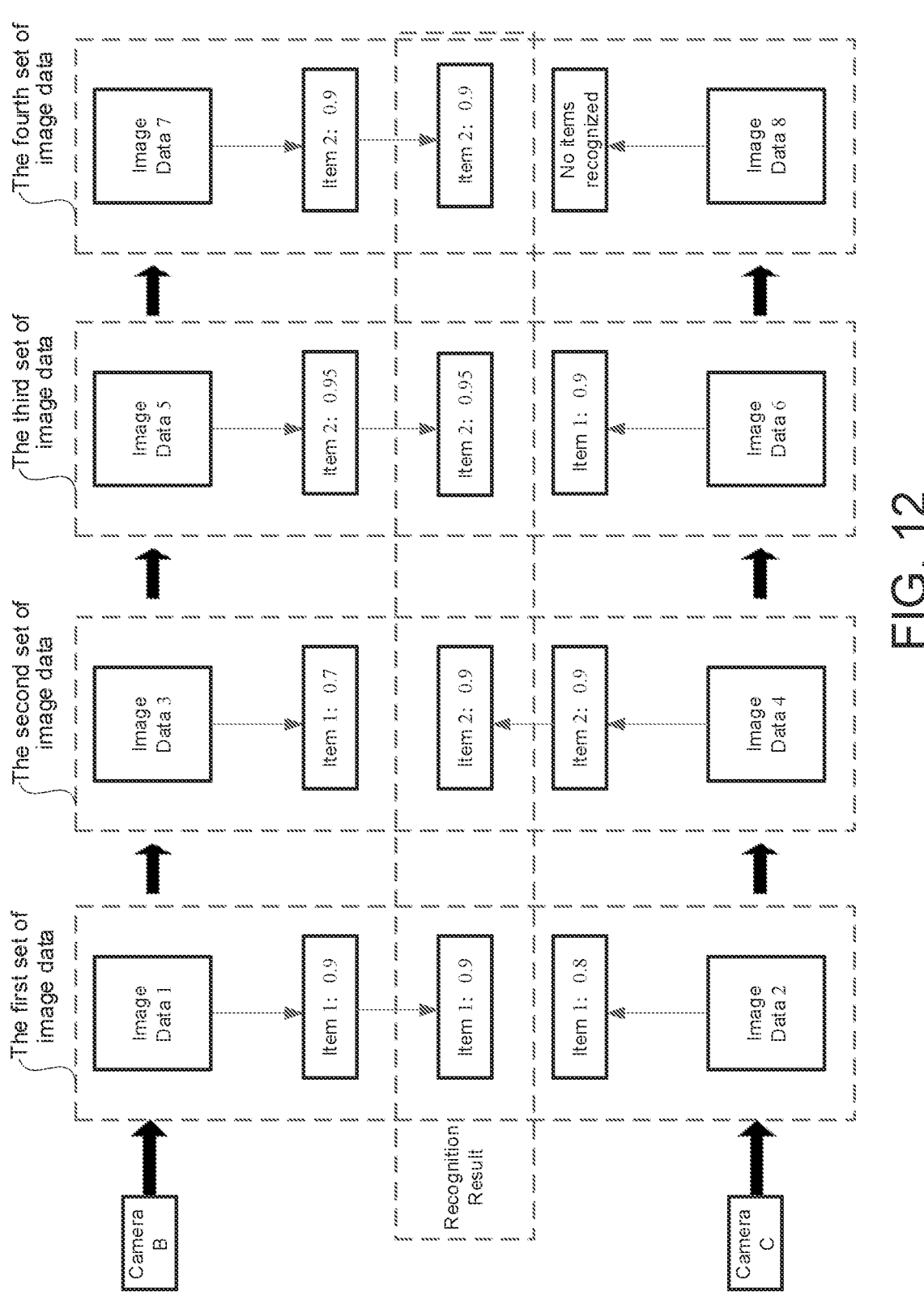
FIG. 12 is a schematic diagram of determining recognition results by plurality of sets of image data in accordance with some embodiments.

As shown in FIG. 12, the storage cabinet acquires four sets of image data from the camera B and the camera C (a first set of image data to a fourth set of image data, respectively), and each set of image data includes two frames of image data. For example, in the first set of image data, an item 1 is recognized in image data 1 and the item 1 has a confidence coefficient of 0.9, and the item 1 is recognized in image data 2 and the item 1 has the confidence coefficient of 0.8, then an item corresponding to the first set of image data is determined as the item 1.

As another example, in the second set of image data, an item 1 is recognized in image data 3 and the item 1 has a confidence coefficient of 0.7, and an item 2 is recognized in image data 4 and the item 2 has a confidence coefficient of 0.9, then an item corresponding to the second set of image data is determined as the item 2. Similarly, the storage cabinet can determine the item corresponding to each set of image data, and obtain a recognition result shown in FIG. 11.

Further, after determining the item corresponding to each set of image data, the storage cabinet may take an item with the largest quantity of occurrences in items recognized in the plurality of sets of image data as the item taken out from the storage cabinet or put into the storage cabinet items. For example, in combination with the recognition result shown in FIG. 11, the item taken out from the storage cabinet is the item 2.

In another example, if it is detected that an item is removed from the storage cabinet, the storage cabinet may further track a moving track of the item to determine whether the item is put into the storage cabinet again. For example, the storage cabinet can detect the moving track of the item according to the intersection over union of two adjacent frames of image data in continuous multiple frames of image data.

In S1104, the storage cabinet outputs multimedia data according to the feature information of the user and the change information of the items in the storage cabinet.

Here, the multimedia data is related to the feature information of the user and/or item(s) having change.

In an example, the storage cabinet may select multimedia data related to the feature information of the user and/or the item from a plurality of pieces of pre-configured multimedia data according to the feature information of the user and/or item(s) having change, and output the multimedia data.

In another example, the storage cabinet may transmit the feature information of the user and the change information of items in the storage cabinet to the server. Accordingly, after receiving, from the storage cabinet, the feature information of the user and the change information of the items in the storage cabinet, the server selects multimedia data related to the feature information of the user and/or the item from the plurality of pieces of multimedia data stored in a database therein, and transmits the multimedia data to the storage cabinet. After receiving the multimedia data from the server, the storage cabinet can output the multimedia data.

In a scenario, the feature information of the user includes a face feature code of the user, and there is an item that is taken out and/or put in the storage cabinet, that is, the storage cabinet can recognize a high-quality face of the user, and the user takes out an item from the storage cabinet and/or puts an item in the storage cabinet.

For example, the storage cabinet can detect whether that the high-quality face exists in a pre-configured face feature library. If there exists, the storage cabinet can determine the multimedia data related to the feature information of the user and the item according to a pre-configured correspondence between the high-quality face, the item and the multimedia data.

Here, the face feature library may include information of a plurality of high-quality faces. The plurality of high-quality faces may be pre-configured, or may be obtained and stored by the storage cabinet performing face recognition on the image data captured by the camera A. The correspondence between the above-mentioned high-quality face, the item and multimedia data may be pre-configured.

As another example, if the high-quality face does not exist in the face feature library, the storage cabinet can determine the multimedia data related to the item according to the correspondence between the item and the multimedia data.

Further, if the high-quality face does not exist in the face feature library, the storage cabinet can store the recognized high-quality face in the face feature library, and configure a face feature code for the high-quality face.

In another scenario, if the feature information of the user does not include the face feature code of the user, but there is an item in the storage cabinet that is taken out or put in, the storage cabinet can output multimedia data related to the item according to the item taken out or put in the storage cabinet.

Based on the technical solution in FIG. 12, in a case of detecting that a user is approaching the storage cabinet, the storage cabinet acquires the feature information of the user; and in a case of detecting that the cabinet door of the storage is opened, the storage cabinet captures image data of the exit location of the storage cabinet from different directions, and determines the changing situation of the items in the storage cabinet according to the image data. That is to say, if the user approaches the storage cabinet and there is a change in the items in the storage cabinet, it means that the user has taken out an item from the storage cabinet and/or put the item into the storage cabinet. In this way, the storage cabinet can output multimedia data related to the feature information of the user and/or the item according to the feature information of the user and the change information of the items in the storage cabinet. In the embodiments of the present disclosure, the multimedia data output by the storage cabinet is determined according to the user's interest in the items in the storage cabinet. Therefore, compared with preset multimedia data, the output multimedia data is more flexible and accurate. Moreover, the output multimedia data is more in line with the actual needs of the user, improving a user experience.

Figure 13:
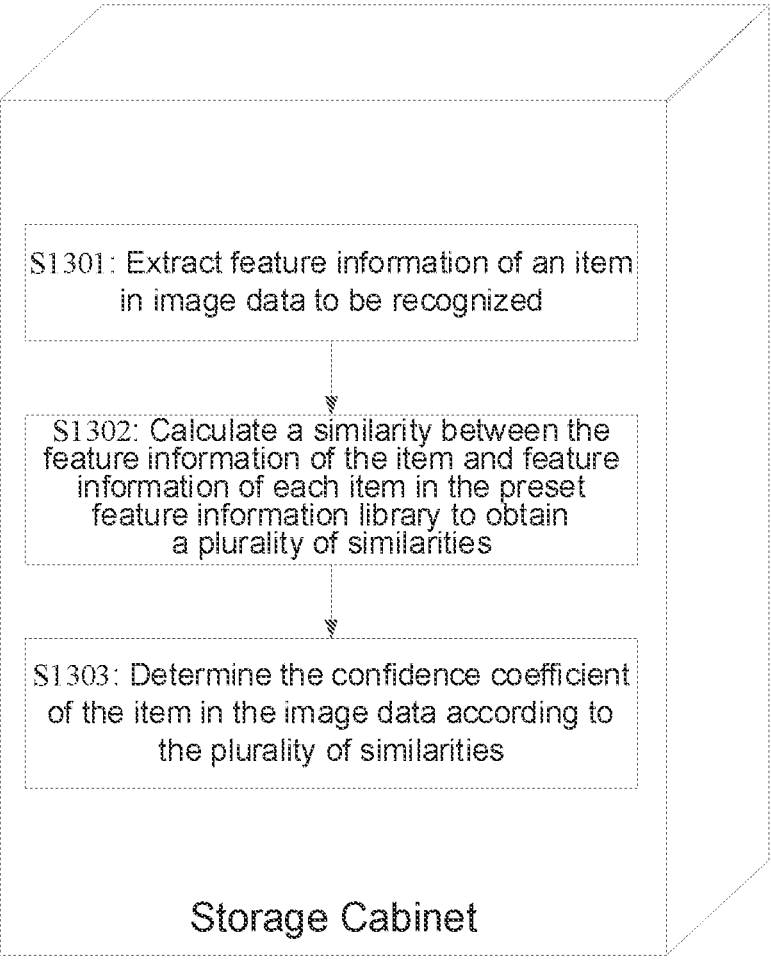
FIG. 13 is a flowchart of determining the confidence coefficient of an item in accordance with some embodiments.

In some embodiments, as shown in FIG. 13, a method for calculating the confidence coefficient of the item may include steps S1301 to S1303.

In S1301, the storage cabinet extracts feature information of an item in image data to be recognized.

Here, the image data to be recognized may include the image data captured by the camera B and the camera C. The feature information of the item may include the shape, structure, color, quantity, etc. of the item.

In an example, the storage cabinet may extract the feature information of the item in the image data according to a preset feature information extraction model. For example, the storage cabinet may input the image data to be recognized into the preset feature information extraction model to obtain the feature information of the item in the image data.

It will be noted that, in the embodiments of the present disclosure, the preset feature information extraction model may be pre-configured for the storage cabinet, or obtained from the server. The preset feature information extraction model may be obtained by training according to a preset algorithm and feature information of a plurality of items. The specific training process may refer to the FIG. 12 above-mentioned.

In S1302, the storage cabinet calculates a similarity between the feature information of the item and feature information of each item in the preset feature information library to obtain a plurality of similarities.

Here, the preset feature information library includes feature information of items of multiple categories. The plurality of items may include items belonging to the storage cabinet and items not belonging to the storage cabinet.

Here, the similarity may also be referred to as feature similarity. For example, the storage cabinet may calculate a cosine similarity between the feature information of the item and the feature information of each item in the preset feature information library.

In S1303, the storage cabinet determines the confidence coefficient of the item in the image data according to the plurality of similarities.

Here, the confidence coefficient of the item is the largest similarity in the plurality of similarities.

Further, in order to improve the accuracy of item recognition, if the largest similarity in the plurality of similarities is greater than a preset threshold, the largest similarity is taken as the confidence coefficient of the item in the image data; if the largest similarity in the plurality of similarities is less than or equal to the preset threshold, the storage cabinet outputs that no item is recognized.

Here, the preset threshold is set as required. For example, the preset threshold may be 0.6, 0.7, or the like, which is not limited.

Based on the technical solution in FIG. 13, after acquiring the feature information of the item in the image data, the storage cabinet calculates the similarity between the item and each item in the preset feature information library, and takes an item with the largest similarity as the item in the image data. Since the items in the preset feature Information library are items of known categories, if the similarity between the item in the image data and the item in the preset feature information library is larger, it means that the two are more similar. Based on this, the storage cabinet can take the category of the item with the largest similarity as the category of the item in the image data, and may quickly recognize the category of the item in the image data, while improving the accuracy of the recognition result.

Figure 14:
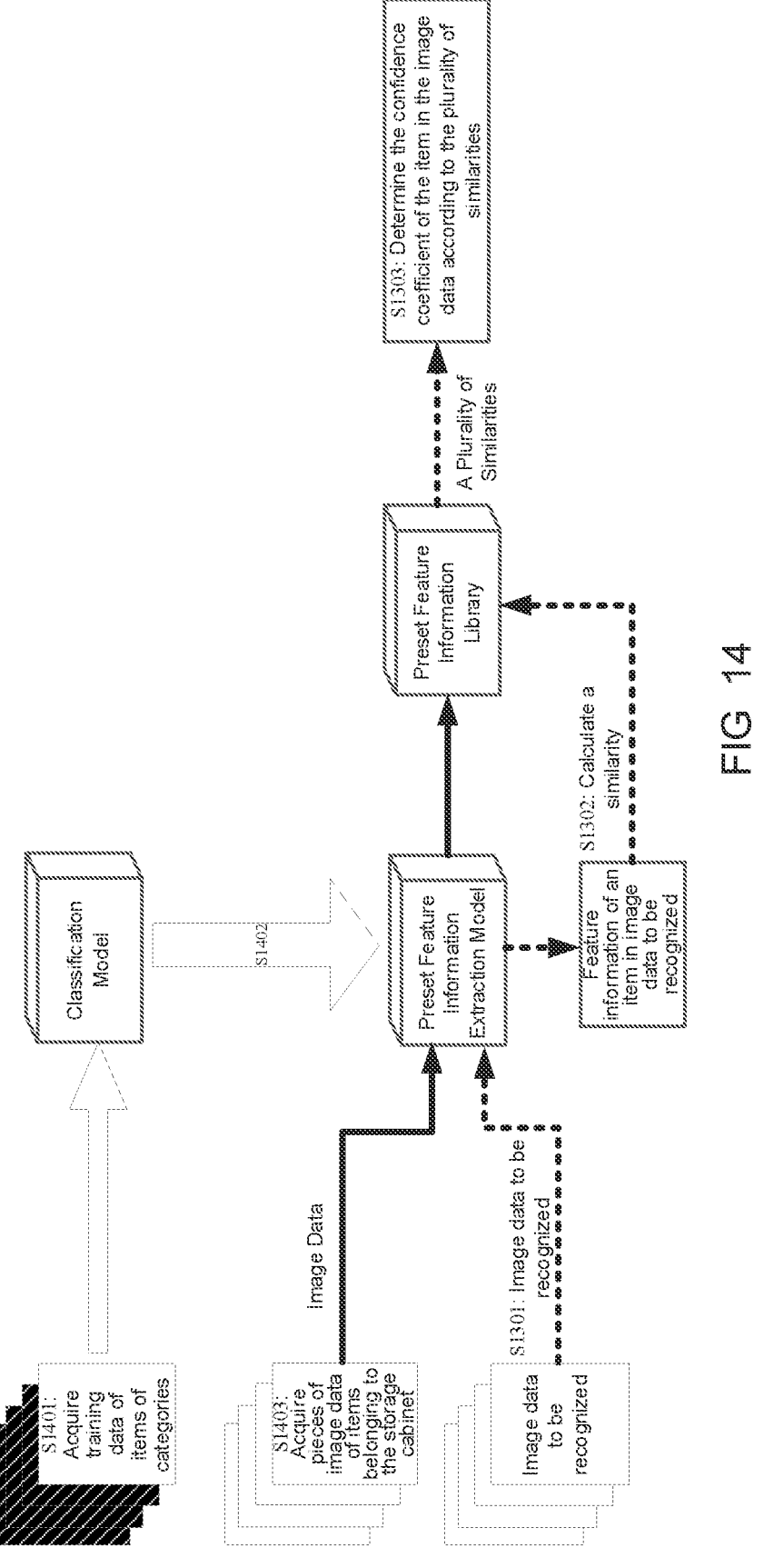
FIG. 14 is a flowchart of determining the confidence coefficient of an item in accordance with some embodiments.

In some embodiments, in combination with FIG. 13, as shown in FIG. 14, a process of training the preset feature information extraction model may include steps S1401 to S1403.

In S1401, training data of items of a plurality of categories is acquired.

Here, the training data of the items may be feature data of the items. The plurality of categories may include categories of items belonging to the storage cabinet and categories of items not belonging to the storage cabinet. For example, the quantity of the categories may be greater than 1000.

In S1402, the training data of the items of the plurality of categories is trained according to a classification model to obtain a preset feature information extraction model.

Here, the classification model is used to classify the training data of the items of the plurality of categories to obtain feature information of items included in each category. Training is performed according to the feature information of the items included in the plurality of categories to obtain the preset feature information extraction model. For example, the classification model may be a MobileNet feature model. Of course, the classification model may also be other classification models, which is not limited.

In S1403, a plurality of pieces of image data of items belonging to the storage cabinet are acquired, and the pieces of image data are input into the preset feature information extraction model severally, to obtain a preset feature information library.

Here, the plurality of image data of the items belonging to the storage cabinet may include multiple frames of image data of items of each category in the storage cabinet. For example, the plurality of image data may include 10 to 100 frames of image data of items of each category in the storage cabinet.

It will be noted that in the embodiments of the present disclosure, an execution subject of S1401 to S1403 above-mentioned may be the server or storage cabinet, which is not limited.

Based on the technical solution in FIG. 14, after obtaining the feature extraction model by training according to the training data of the items of the plurality of categories, the storage cabinet inputs the image data of items of each category in the storage cabinet to the feature extraction model, thereby obtaining the feature information of the item in each frame of image data accurately and quickly.

It will be noted that various embodiments of the present disclosure may learn from or refer to each other. For example, same or similar steps, method embodiments, system embodiments and device embodiments may refer to each other, which are not limited.

In some embodiments, in order to accurately recognize the item in the image data, the storage cabinet may recognize the image data according to a rotation detection model.

Figure 15:
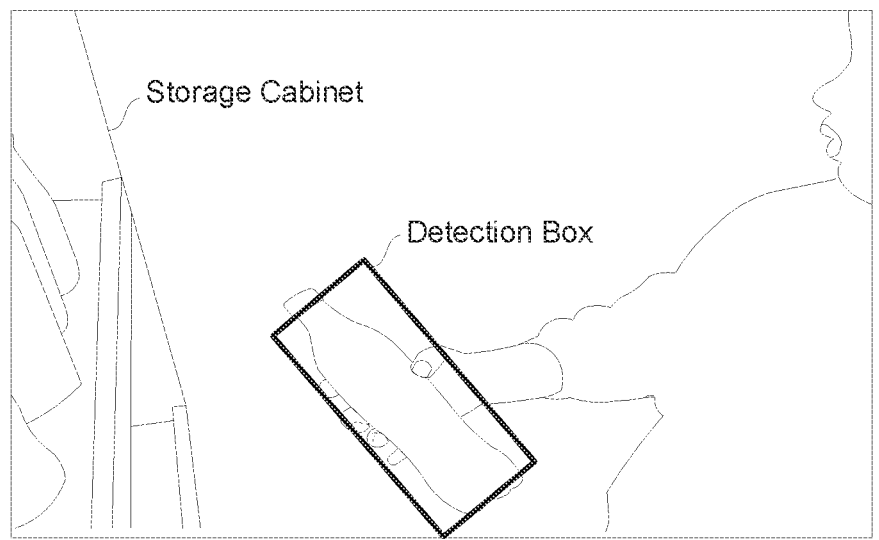
FIG. 15 is a schematic diagram of recognizing an item in accordance with some embodiments.

Here, the rotation detection model can be used to detect items of a plurality of categories (labeled as objects). For example, the rotation detection model can determine a detection box of an item, and recognize the item based on the detection box. For example, the detection box may be as shown in FIG. 15.

Here, the items of the plurality of categories may include items belonging to the storage cabinet and items not belonging to the storage cabinet.

In an example, the storage cabinet may obtain the rotation detection model by training using a deep learning detection algorithm (such as yolov5).

In this way, the storage cabinet may quickly and accurately detect the item in the image data based on the rotation detection model.

Figure 16:
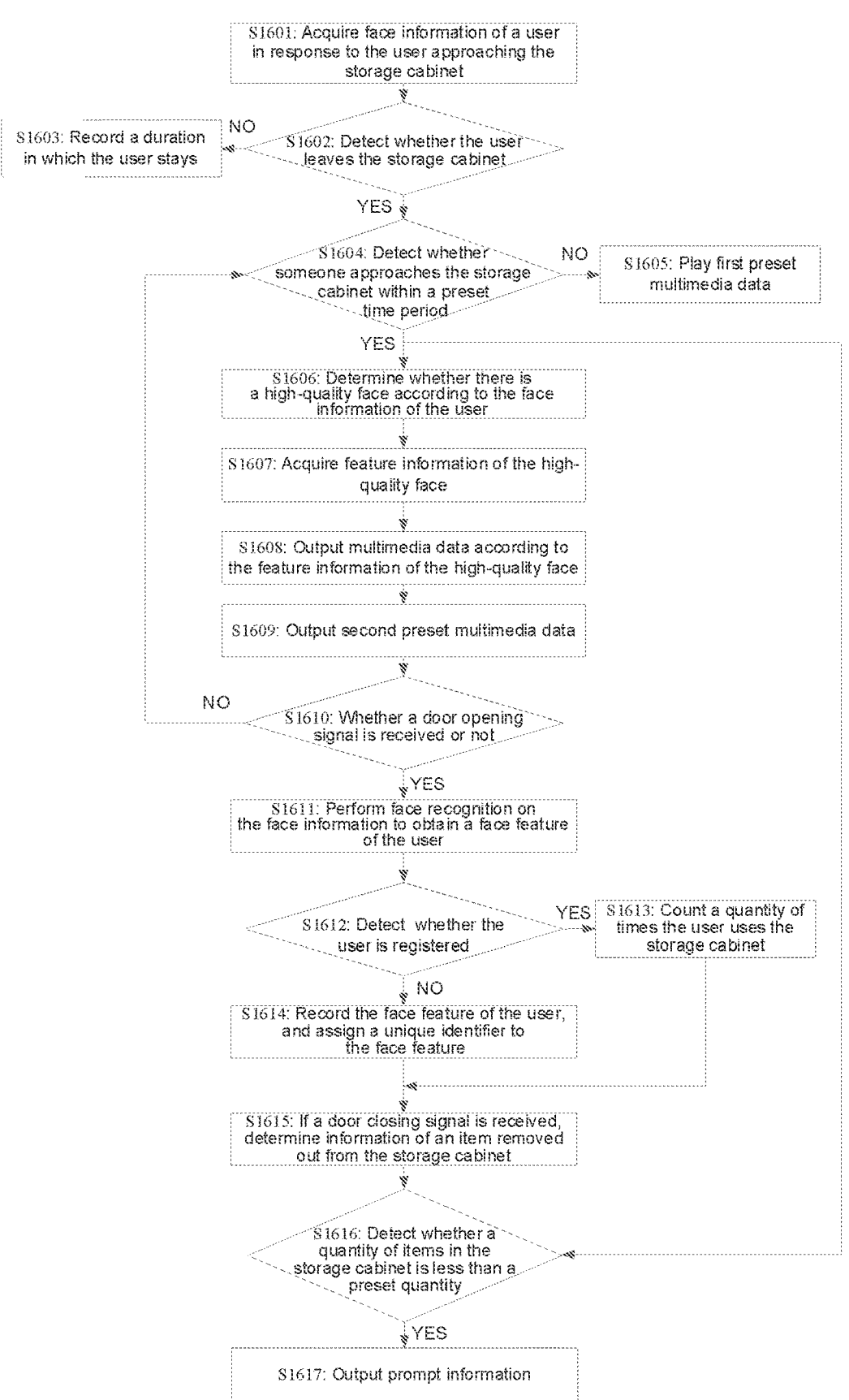
FIG. 16 is a flowchart of a method for managing a storage cabinet in accordance with some embodiments.

In some embodiments, as shown in FIG. 16, embodiments of the present disclosure provide a method for managing a storage cabinet, and the method includes the following steps.

In S1601, face information of a user is acquired in response to the user approaching the storage cabinet.

Here, S1601 may be described with reference to S1101 above and will not be repeated.

In S1602, it is detected whether the user leaves the storage cabinet.

In an example, the storage cabinet may determine whether the user leaves the storage cabinet according to a change in a distance between the user and the storage cabinet.

For example, the storage cabinet detects that the user is approaching the storage cabinet, but does not detect that the cabinet door has been opened. In this case, after a preset time period, if the distance between the user and the storage cabinet is greater than a preset distance, it means that the user has left the storage cabinet. If the storage detects that the cabinet door of the storage cabinet is opened, it means that the user has not left the storage cabinet.

Here, if the storage cabinet detects that the user has not left the storage cabinet, S1603 is executed; if the storage cabinet detects that the user leaves the storage cabinet, S1604 is executed.

In S1603, a duration in which the user stays is recorded.

Here, the duration in which the user stays may refer to a duration between the time when the storage cabinet detects that the user approaches the storage cabinet and the time when the user leaves the storage cabinet.

In S1604, it is detected whether someone approaches the storage cabinet within a preset time period.

Here, if no one approaches the storage cabinet within the preset time period, S1605 is executed; if it is detected that someone approaches the storage cabinet within the preset time period, S1606 and S1616 are executed.

In S1605, first preset multimedia data is played.

Here, the first preset multimedia data may be pre-configured.

In S1606, it is determined whether there is a high-quality face according to the face information of the user.

Here, if exists, S1607 and S1608 are executed; if not, S1609 is executed.

In S1607, feature information of the high-quality face is acquired.

In S1608, multimedia data is output according to the feature information of the high-quality face.

Here, the multimedia data is related to the feature information of the user.

In S1609, second preset multimedia data is output.

Here, the second preset multimedia data may be pre-configured. The first preset multimedia data and the second preset multimedia data may be the same or different.

In S1610, whether a door opening signal is received or not.

Here, if the door opening signal is not received, S1604 is executed; if the door opening signal is received, S1611 is executed.

In S1611, face recognition is performed on the face information to obtain a face feature of the user.

In S1612, it is detected whether the user is registered.

Here, registration may mean that the feature information of the user has been acquired or recorded.

For example, the storage cabinet may perform similarity calculation on the feature information of the user and acquired feature information of the user, and detect whether there is feature information whose similarity with the feature information of the user is greater than a preset threshold. If so, it means that the user has already registered; if not, it means that the user is not registered.

Here, if the user has registered, S1613 is executed; if the user has not registered, S1614 is executed.

In S1613, a quantity of times the user uses the storage cabinet is counted.

Here, the quantity of times the user uses the storage cabinet may refer to a quantity of times the user opens the storage cabinet. That is, if the storage cabinet detects that the user opens the storage cabinet once, the quantity of times the user opens the storage cabinet is increased by a first value (such as 1), to obtain the quantity of times the user uses the storage cabinet.

Based on the quantity of times the user uses the storage cabinet, in a case where the user uses the storage cabinet again or approaches the storage cabinet later, the multimedia data related to the user may be output.

In S1614, the face feature of the user is recorded, and a unique identifier is assigned to the face feature.

The method may further include the following steps.

In S1615, if a door closing signal is received, information of an item removed out from the storage cabinet is determined.

Here, the information of the item may include a category and quantity of items.

In S1616, it is detected whether a quantity of items in the storage cabinet is less than a preset quantity.

Here, the preset quantity is set as required. For example, the preset quantity may be 5, 10, or the like, which are not limited.

In S1617, if the quantity of the items in the storage cabinet is less than the preset quantity, prompt information is output.

Here, the prompt information can be used to prompt for replenishing the items in time.

Here, for each step in FIG. 16, reference may be made to the descriptions of the foregoing embodiments, and details are not repeated here.

Embodiments of the present disclosure may divide an apparatus for managing the storage cabinet into functional modules or functional units according to the above method examples, for example, the apparatus may be divided into various functional modules or functional units corresponding to various functions, or two or more functions may be integrated in a single processing module. The above integrated module can be realized either in the form of hardware or in the form of software functional modules or functional units. Here, the division of the modules or units in the embodiments of the present disclosure is schematic and is merely a logical functional division, and there may be other divisions when actually realized.

Figure 17:
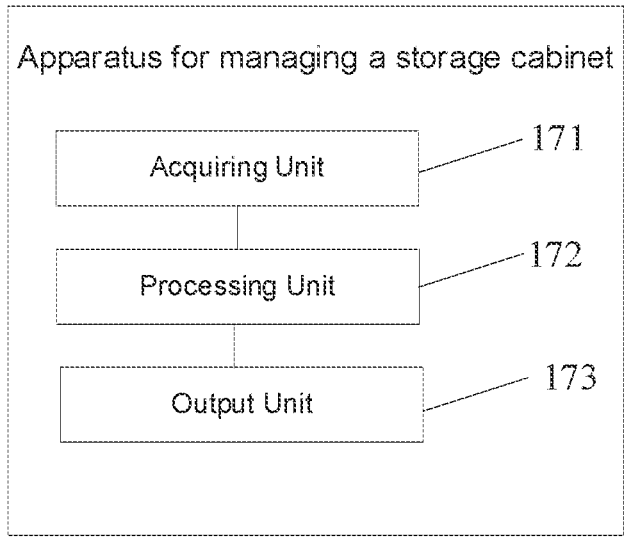
FIG. 17 is a structural diagram of a management apparatus in accordance with some embodiments.

As shown in FIG. 17, FIG. 17 is a schematic structural diagram of an apparatus for managing a storage cabinet provided by the embodiments of the present disclosure. The apparatus includes: an acquiring unit 171, a processing unit 172 and an output unit 173.

The acquiring unit 171 is configured to acquire face information of a user in response to the user approaching the storage cabinet.

The processing unit 172 is configured to determine feature information of the user according to the face information of the user.

The acquiring unit 171 is configured to acquire a plurality of sets of image data in response to an operation of opening the storage cabinet by the user, where a set of image data in the plurality of sets of image data includes multiple frames of image data obtained by taking photographs of an exit location of the storage cabinet from different directions at a same time.

The processing unit 172 is further configured to determine change information of items in the storage cabinet according to the plurality of sets of image data.

The output unit 173 is configured to output multimedia data related to the feature information of the user and/or the items according to the feature information of the user and the change information of the items in the storage cabinet.

In some embodiments, the change information of the items in the storage cabinet includes taking out an item from the storage cabinet and/or putting an item into the storage cabinet. The processing unit 172 is configured to: determine an item corresponding to each set of image data in the plurality of sets of image data; and determine the change information of the items in the storage cabinet according to information of items corresponding to the plurality of sets of image data.

In some embodiments, the processing unit 172 is configured to: determine a confidence coefficient of an item included in each frame of image data in a first set of image data, the first set of image data being any set of image data in the plurality of sets of image data, and the confidence coefficient being used to characterize a similarity between the item and a preset item; and take an item with a largest confidence coefficient in the first set of image data as an item corresponding to the first set of image data.

In some embodiments, the processing unit 172 is configured to: input the image data into a preset feature information extraction model to obtain feature information of the item in the image data; and calculate a similarity between the feature information of the item and feature information of the preset item to obtain the confidence coefficient of the item, the preset item being an item belonging to the storage cabinet.

In some embodiments, the processing unit 172 is configured to: in response to detecting that item(s) is removed from the storage cabinet, determine a category and quantity of the item(s) taken out from the storage cabinet according to the plurality of sets of image data; and/or in response to detecting that item(s) is moved into the storage cabinet, determine a category and quantity of the item(s) put into the storage cabinet according to the plurality of sets of image data.

In some embodiments, the processing unit 172 is further configured to: perform image recognition on the plurality of sets of image data to determine location change information of the items in the plurality of sets of image data; if the location change information of the items is moving an item from inside of the storage cabinet out of a bounding box of the storage cabinet, determine that the item is moved out from the storage cabinet; and if the location change information of the items is moving an item from outside of the storage cabinet into the bounding box of the storage cabinet, determine that the item is moved into the storage cabinet.

In some embodiments, the storage cabinet is provided with a plurality of cameras, each camera is used to capture image data of the exit location of the storage cabinet, and capturing directions of the plurality of cameras are different. The processing unit 172 is further configured to, for any camera of the plurality of cameras, select a plurality of pixel points on a frame of the storage cabinet from image data captured by the camera in response to a selection operation; and acquire the bounding box of the storage cabinet in the image data by connecting the plurality of pixel points in sequence.

In some embodiments, the acquiring unit 171 is configured to acquire image data of the user in response to detecting that a distance between the user and a cabinet door of the storage cabinet is less than a preset distance and the storage cabinet is not opened. The processing unit 172 is configured to perform face recognition on the image data to obtain the face information of the user.

In some embodiments, the processing unit 172 is configured to: input the face information of the user into a preset face feature extraction model to obtain a face feature code of the user; calculate a similarity between the face feature code of the user and face feature codes included in a preset face feature library, the preset face feature library including a plurality of face feature codes and feature information corresponding thereto, and different face feature codes in the preset face feature library corresponding to different identifiers; and if a similarity between a first face feature code and the face feature code of the user is greater than a preset threshold, take feature information corresponding to the first face feature code as the feature information of the user, the first face feature code being a face feature code with the largest similarity to the face feature code of the user in the plurality of face feature codes.

In some embodiments, the processing unit 172 is further configured to, if the similarity between the first face feature code and the face feature code of the user is less than or equal to the preset threshold, store the face feature code of the user in the preset face feature library.

In some embodiments, the output unit 173 is configured to: transmit the face feature code of the user and the change information of the items in the storage cabinet to a server in response to an operation of closing the storage cabinet by the user, causing the server to determine the multimedia data related to the face feature code and the items; and receive, from the server, the multimedia data, and output the multimedia data.

In some embodiments, the processing unit 172 is further configured to, determine information of the items in the storage cabinet in response to closing the storage cabinet; and if a quantity of the items in the storage cabinet is less than a preset quantity, output prompt information, the prompt information being used to prompt for increasing the items in the storage cabinet.

In some embodiments, the output unit 173 is further configured to, if there is no the change information of the items in the plurality of sets of image data, output the multimedia data related to the feature information of the user according to the feature information of the user.

When implemented by hardware, the acquiring unit 171 in the embodiments of the present disclosure may be integrated on a communication interface, and the processing unit 172 may be integrated on a processor. The specific implementation is shown in FIG. 18.

Figure 18:
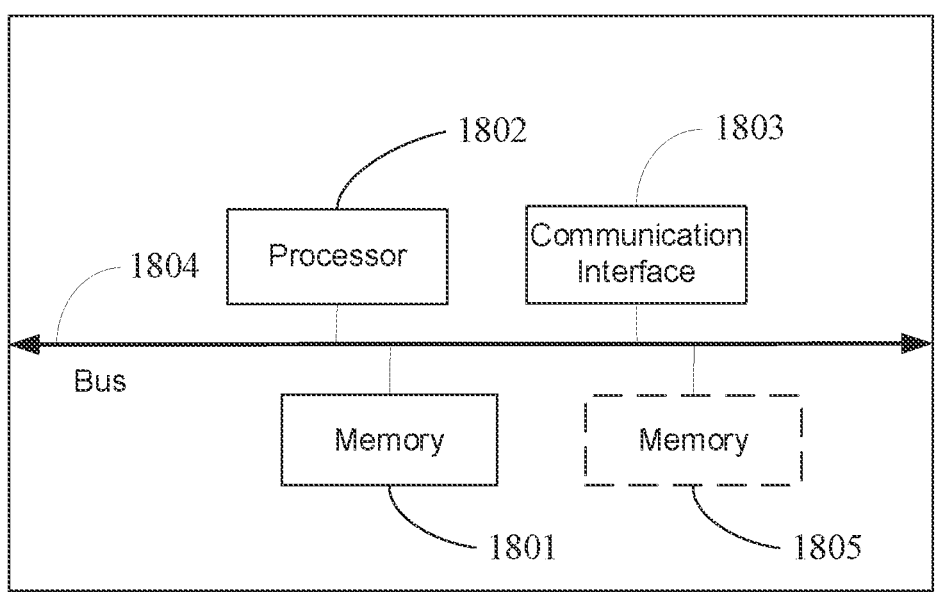
FIG. 18 is a structural diagram of a management apparatus in accordance with some embodiments.

FIG. 18 is a possible structural schematic diagram of the apparatus for managing the storage cabinet involved in the above embodiments. The apparatus includes: a processor 1802 and a communication interface 1803. The processor 1802 is used to control and manage actions of the apparatus, for example, to execute steps executed by the processing unit 172 above-mentioned, and/or to execute other processes of the technology described herein. The communication interface 1803 is used to support communication between the apparatus and other network entities, for example, to execute steps performed by the acquiring unit 171 above-mentioned. The apparatus may further include a memory 1801 and a bus 1804, and the memory 1801 is used to store program codes and data of the apparatus.

Here, the memory 1801 may be a memory in the apparatus. The memory may include a volatile memory, such as a random access memory; alternatively, the memory may include a non-volatile memory, such as a read-only memory, flash memory, hard disk or solid-state hard disk; alternatively, the memory may include a combination of memories of the above-mentioned types.

The processor 1802 may implement or execute various illustrative logical blocks, modules and circuits described in content of the present disclosure. The processor may be a central processing unit, a general-purpose processor, a digital signal processor, an application-specific integrated circuit, a field programmable gate array or other programmable logic device, a transistor logic device, a hardware component, or any combination thereof. The processor may also be a combination that implements computing functions, for example, a combination including one or more microprocessors, a combination of a digital signal processor (DSP) and a microprocessor, or the like.

The bus 1804 may be an extended industry standard architecture (EISA) bus or the like. Buses 1804 may be divided into an address bus, a data bus, a control bus and so on. For ease of representation, only a single thick line is used in FIG. 18 to represent the bus, but it does not mean that there is only one bus or one type of bus.

The apparatus in FIG. 18 may also be a chip. The chip includes one or more (including two) processors 1802 and a communication interface 1803.

Optionally, the chip further includes a memory 1805, which may include a read-only memory and a random access memory, and provide operation instructions and data to the processors 1802. A part of the memory 1805 may further include a non-volatile random access memory (NVRAM).

In some implementations, the memory 1805 stores the following elements: execution modules or data structures, or their subsets, or their extended sets.

In the embodiments of the present disclosure, a corresponding operation is executed by calling an operation instruction stored in the memory 1805 (the operation instruction may be stored in an operating system).

Some embodiments of the present disclosure provide a computer-readable storage medium (for example, a non-transitory computer-readable storage medium), the computer-readable storage medium has stored computer program instructions, and the computer program instructions, when executed on a computer (e.g., the storage cabinet), cause the computer to perform the method for managing the storage cabinet according to any of the above embodiments.

For example, the computer-readable storage medium includes, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure provide a computer program product, which is stored on, for example, a non-transitory computer-readable storage medium. The computer program product includes computer program instructions, and the computer program instructions, when are executed on a computer (e.g., the storage cabinet), cause the computer to perform the method for managing the storage cabinet according to any of the above embodiments.

Some embodiments of the present disclosure provide a computer program. The computer program, when executed by a computer (e.g., the storage cabinet), causes the computer to perform the method for managing the storage cabinet according to any of the above embodiments.

Beneficial effects of the computer-readable storage medium, the computer program product and the computer program are the same as the beneficial effects of the method for managing the storage cabinet as described in the above embodiments, and details will not be repeated here.

In several embodiments provided in the present disclosure, it will be understood that the disclosed systems, apparatuses and methods may be implemented through other manners. For example, the apparatus embodiments described above are merely schematic. For example, the division of the units described, is merely a logical functional division, and the actual implementation may be divided in another way. For example, multiple units or components may be combined or may be integrated into another system, or some features may be ignored, or not implemented. Another point is that the mutual coupling or direct coupling or communication connection shown or discussed may be an indirect coupling or communication connection through some interfaces, devices or units, which may be electrical, mechanical or in other forms.

The units illustrated as separated components may or may not be physically separated, and components displayed as units may or may not be physical units, i.e., they may be located in one place, or they may be distributed to multiple network units. Some or all of these units may be selected to achieve the purpose of the solutions in the embodiments according to actual needs.

In addition, various functional units in various embodiments of the present disclosure may be integrated in a single processing unit, or each unit may physically exist separately, or two or more units may be integrated in a single unit.

The foregoing descriptions are merely specific implementations of the present disclosure, but the protection scope of the present disclosure is not limited thereto; any person skilled in the art could readily conceive of changes or replacements within the technical scope of the present disclosure, which shall all be included in the protection scope of the present disclosure. Therefore, the protection scope of the present disclosure should be determined by the protection scope of the claims.

What is claimed is:

1. A method for managing a storage cabinet, comprising:
  acquiring face information of a user in response to the user approaching the storage cabinet, and determining feature information of the user according to the face information of the user;
  acquiring a plurality of sets of image data in response to an operation of opening the storage cabinet by the user, a set of image data in the plurality of sets of image data including multiple frames of image data obtained by taking photographs of an exit location of the storage cabinet from different directions at a same time;
  determining change information of items in the storage cabinet according to the plurality of sets of image data; and
  outputting multimedia data according to the feature information of the user and the change information of the items in the storage cabinet, the multimedia data being related to at least one of the feature information of the user or the items, the multimedia data being determined according to interest of the user in the items in the storage cabinet; and the interest of the user in the items in the storage cabinet being determined according to the change information of the items in the storage cabinet;
  wherein acquiring the face information of the user in response to the user approaching the storage cabinet, includes:

acquiring image data of the user in response to detecting that a distance between the user and a cabinet door of the storage cabinet is less than a preset distance and the storage cabinet is not opened, and performing face recognition on the image data to obtain the face information of the user; and
  if clarity of a face of the user in the image data satisfies a first preset threshold, determining the feature information of the user according to the face information of the user.

2. The method according to claim 1, wherein the change information includes taking out an item from the storage cabinet and/or putting an item into the storage cabinet; determining the change information of the items in the storage cabinet according to the plurality of sets of image data, includes:
  determining an item corresponding to each set of image data in the plurality of sets of image data; and
  determining the change information of the items in the storage cabinet according to information of items corresponding to the plurality of sets of image data.

3. The method according to claim 2, wherein determining the item corresponding to each set of image data in the plurality of sets of image data, includes:
  determining a confidence coefficient of an item included in each frame of image data in a first set of image data, wherein the first set of image data is any set of image data in the plurality of sets of image data, and the confidence coefficient is used to characterize a similarity between the item and a preset item; and
  taking an item with a largest confidence coefficient in the first set of image data as an item corresponding to the first set of image data.

4. The method according to claim 3, wherein determining the confidence coefficient of the item included in each frame of image data in the first set of image data, includes:
  inputting each frame of image data in the first set of image data into a preset feature information extraction model to obtain feature information of the item in the frame of image data; and
  calculating a similarity between the feature information of the item and feature information of the preset item to obtain the confidence coefficient of the item, the preset item being an item belonging to the storage cabinet.

5. The method according to claim 2, wherein determining the change information of the items in the storage cabinet according to the plurality of sets of image data, includes:
  in response to detecting that one or more items are removed from the storage cabinet, determining a category and quantity of the one or more items taken out from the storage cabinet according to the plurality of sets of image data; and/or
  in response to detecting that one or more items are moved into the storage cabinet, determining a category and quantity of the one or more items put into the storage cabinet according to the plurality of sets of image data.

6. The method according to claim 5, further comprising:
  performing image recognition on the plurality of sets of image data to determine location change information of the items in the plurality of sets of image data;
  if the location change information of the items is moving an item from inside of the storage cabinet out of a bounding box of the storage cabinet, determining that the item is moved out from the storage cabinet; and
  if the location change information of the items is moving an item from outside of the storage cabinet into the bounding box of the storage cabinet, determining that the item is moved into the storage cabinet.

7. The method according to claim 6, wherein the storage cabinet is provided with a plurality of cameras, each camera is used to capture image data of the exit location of the storage cabinet, and capturing directions of the plurality of cameras are different; the method further comprises:

for any camera of the plurality of cameras, selecting a plurality of pixel points on a frame of the storage cabinet from image data captured by the camera in response to a selection operation; and acquiring the bounding box of the storage cabinet in the image data by connecting the plurality of pixel points in sequence.

8. The method according to claim 5, further comprising:

in response to detecting that an item is removed from the storage cabinet, tracking a moving track of the item to determine whether the item is put into the storage cabinet again.

9. The method according to claim 8, wherein tracking the moving track of the item, includes:

detecting the moving track of the item according to an intersection over union of two adjacent frames of image data in continuous multiple frames of image data.

10. The method according to claim 1, wherein determining the feature information of the user according to the face information of the user, includes:

inputting the face information of the user into a preset face feature extraction model to obtain a face feature code of the user;

calculating a similarity between the face feature code of the user and face feature codes included in a preset face feature library, wherein the preset face feature library includes a plurality of face feature codes and feature information corresponding thereto, and different face feature codes in the preset face feature library correspond to different identifiers; and if a similarity between a first face feature code and the face feature code of the user is greater than a second preset threshold, taking feature information corresponding to the first face feature code as the feature information of the user, the first face feature code being a face feature code with a largest similarity to the face feature code of the user in the plurality of face feature codes.

11. The method according to claim 10, further comprising:

if the similarity between the first face feature code and the face feature code of the user is less than or equal to the second preset threshold, storing the face feature code of the user in the preset face feature library.

12. The method according to claim 10, wherein outputting the multimedia data according to the feature information of the user and the change information of the items in the storage cabinet, includes:

transmitting the face feature code of the user and the change information of the items in the storage cabinet to a server in response to an operation of closing the storage cabinet by the user, causing the server to determine the multimedia data related to the face feature code and the items; and receiving, from the server, the multimedia data, and outputting the multimedia data.

13. The method according to claim 1, further comprising: determining information of the items in the storage cabinet in response to closing the storage cabinet; and if a quantity of the items in the storage cabinet is less than a preset quantity, outputting prompt information, the prompt information being used to prompt for increasing the items in the storage cabinet.

14. The method according to claim 1, further comprising:

if there is no the change information of the items in the plurality of sets of image data, outputting multimedia data related to the feature information of the user according to the feature information of the user.

15. The method according to claim 1, wherein determining the change information of the items in the storage cabinet according to the plurality of sets of image data, includes:

in response to detecting that one or more items are removed from the storage cabinet, determining a category and quantity of the one or more items taken out from the storage cabinet according to the plurality of sets of image data; and/or in response to detecting that one or more items are moved into the storage cabinet, determining a category and quantity of the one or more items put into the storage cabinet according to the plurality of sets of image data.

16. The method according to claim 1, wherein outputting the multimedia data related to at least one of the feature information of the user or the items, includes:

selecting the multimedia data related to at least one of the feature information of the user or the items from a plurality of pieces of pre-configured multimedia data; and outputting the multimedia data.

17. An apparatus for managing a storage cabinet, comprising: a processor and a communication interface, wherein the communication interface is coupled to the processor, and the processor is used to run a computer program or instructions to implement:

acquiring face information of a user in response to the user approaching the storage cabinet, and determining feature information of the user according to the face information of the user;

acquiring a plurality of sets of image data in response to an operation of opening the storage cabinet by the user, a set of image data in the plurality of sets of image data including multiple frames of image data obtained by taking photographs of an exit location of the storage cabinet from different directions at a same time;

determining change information of items in the storage cabinet according to the plurality of sets of image data; and outputting multimedia data according to the feature information of the user and the change information of the items in the storage cabinet, the multimedia data being related to at least one of the feature information of the user or the items, the multimedia data being determined according to interest of the user in the items in the storage cabinet; and the interest of the user in the items in the storage cabinet being determined according to the change information of the items in the storage cabinet;

wherein acquiring the face information of the user in response to the user approaching the storage cabinet, includes:

acquiring image data of the user in response to detecting that a distance between the user and a cabinet door of the storage cabinet is less than a preset distance and the storage cabinet is not opened, and performing face recognition on the image data to obtain the face information of the user; and if clarity of a face of the user in the image data satisfies a first preset threshold, determining the feature information of the user according to the face information of the user.

18. A storage cabinet, comprising the apparatus according to claim 17, a sensor and a plurality of cameras, the apparatus being communicatively connected to the sensor and the plurality of cameras respectively, wherein the sensor is used to, detect whether a cabinet door of the storage cabinet is opened, and if it is detected that the cabinet door of the storage cabinet is opened, output a door opening signal; and the plurality of cameras are arranged at different locations of a door frame of the storage cabinet and have different orientations; and the plurality of cameras are used to take photographs of an exit location of the storage cabinet at a same time in response to the door opening signal to obtain a plurality of sets of image data.

19. A non-transitory computer-readable storage medium, having stored instructions that, when executed by a computer, cause the computer to perform the method for managing the storage cabinet according to claim 1.

\* \* \* \* \*